(12) United States Patent
Liu et al.

(10) Patent No.: US 9,329,361 B1
(45) Date of Patent: May 3, 2016

(54) OPTICAL IMAGING LENS ASSEMBLY

(71) Applicant: GLORY SCIENCE CO., LTD., Changhua Hsien (TW)

(72) Inventors: Kun-Ti Liu, Changhua Hsien (TW); Feng-Chao Chung, Changhua Hsien (TW)

(73) Assignee: Glory Science Co., Ltd., Changhua Hsien (TW)

( * ) Notice: Subject to any disclaimer, the term of this patent is extended or adjusted under 35 U.S.C. 154(b) by 0 days.

(21) Appl. No.: 14/606,740

(22) Filed: Jan. 27, 2015

(51) Int. Cl.
*G02B 9/34* (2006.01)
*G02B 3/02* (2006.01)
*G02B 13/00* (2006.01)

(52) U.S. Cl.
CPC ............... *G02B 13/004* (2013.01); *G02B 9/34* (2013.01)

(58) Field of Classification Search
USPC .................................. 359/771, 772, 773, 774
See application file for complete search history.

(56) References Cited

U.S. PATENT DOCUMENTS 7,145,736 B2    12/2006 Noda

*Primary Examiner* — Jack Dinh
(74) *Attorney, Agent, or Firm* — Gemini Patent Services, Inc.

(57) ABSTRACT

An optical imaging lens assembly includes an aperture stop and an optical assembly, the optical assembly includes, in order from the object side to the image side: a first lens element with a positive refractive power; a second lens element with a negative refractive power; a third lens element with a positive refractive power; a fourth lens element with a refractive power; wherein a radius of curvature of an object-side surface of the second lens element is R3, a radius of curvature of an image-side surface of the second lens element is R4, a radius of curvature of an object-side surface of the third lens element is R5, a radius of curvature of an image-side surface of the third lens element is R6, and the following conditions are satisfied: $-0.62 < (R3-R4)/(R3+R4) < -0.51$; $0.54 < (R5-R6)/(R5+R6) < 0.67$.

18 Claims, 16 Drawing Sheets

OPTICAL IMAGING LENS ASSEMBLY

BACKGROUND OF THE INVENTION

1. Field of the Invention

The present invention relates to an optical lens system, and more particularly to a miniaturized optical imaging lens assembly applicable to electronic products.

2. Description of the Prior Art

In recent years, with the rapid development of devices, such as, smartphone, tablet computer and so on, small optical lens system applied to mobile devices has been indispensable. In addition, as the advanced semiconductor manufacturing technologies have allowed the image sensors with smaller size and higher pixel, small optical lens systems have increasingly higher pixel, there's an increasing demand for an optical lens system with better image quality.

A conventional optical lens system used in mobile phone camera usually consists of three lens elements, such as the optical lens system described in U.S. Pat. No. 7,145,736. However, the angle of view cannot be improved due to the limitation of the lens elements. In addition, as the pixel size of image sensors is allow to be reduced and compact, the requirement for image quality of the compact optical lens system increases significantly. However, the conventional optical lens systems cannot satisfy the requirement of the compact optical lens systems.

The present invention has been made in order to solve the above-mentioned problems.

SUMMARY OF THE INVENTION

The primary objective of the present invention is to provide an optical imaging lens assembly having high resolution, wider angle of view, and is favorable to be used in mobile devices under the condition that image quality and small size can be taken into account synchronously by good configuration of the lens thickness.

According to one aspect of the present invention, an optical imaging lens assembly comprises an aperture stop and an optical assembly, the optical assembly comprises, in order from the object side to the image side: a first lens element with a positive refractive power having an aspheric object-side surface being convex near the optical axis and an aspheric image-side surface, the first lens element being made of plastic material; a second lens element with a negative refractive power having an aspheric object-side surface being concave near the optical axis and an aspheric image-side surface being convex near the optical axis; a third lens element with a positive refractive power having an aspheric object-side surface and an aspheric image-side surface being convex near the optical axis, the third lens element being made of plastic material; a fourth lens element with a refractive power having an aspheric object-side surface being convex near the optical axis and an aspheric image-side surface being concave near the optical axis, the fourth lens element being made of plastic material, at least one inflection point being formed on the object-side surface and the image-side surface of the fourth lens element.

Wherein the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, and the following conditions are satisfied:

$$-0.62 < (R3-R4)/(R3+R4) < -0.51;$$

$$0.54 < (R5-R6)/(R5+R6) < 0.67.$$

If (R3−R4)/(R3+R4) satisfies the above condition, it will be favorable to correct the spherical aberration of the optical imaging lens assembly.

If (R5−R6)/(R5+R6) satisfies the above condition, it will be favorable to correct the aberrations and reduce the track length of the optical imaging lens assembly.

Preferably, the central thickness of the first lens element is CT1, the central thickness of the third lens element is CT3, the distance along the optical axis between the object-side surface of the first lens element and the image-side surface of the fourth lens element is TD, and the following condition is satisfied: $0.49 < (CT1+CT3)/TD < 0.61$, so that the thickness of the lens elements will be more proper, which can distribute the positive refractive power of the optical imaging lens assembly effectively, so as to balance the image quality and the sensitivity.

Preferably, the central thickness of the second lens element is CT2, the central thickness of the fourth lens element is CT4, the distance along the optical axis between the object-side surface of the first lens element and the image-side surface of the fourth lens element is TD, and the following condition is satisfied: $0.25 < (CT2+CT4)/TD < 0.32$, it can maintain the objective of miniaturization of the optical imaging lens assembly and it will be favorable to reduce the peripheral astigmatism and distortion.

Preferably, the f-number of the optical imaging lens assembly is Fno, and the following condition is satisfied: $2.0 \leq Fno \leq 2.4$, it can increase the incident light with respect to the lens elements, so as to improve the image contrast.

Preferably, the focal length of the first lens element is f1, the focal length of the second lens element is f2, and the following condition is satisfied: $-0.76 < f1/f2 < -0.61$, it will be favorable to enlarge the field of view and can better control the aberrations of the optical imaging lens assembly.

Preferably, the focal length of the second lens element is f2, the focal length of the fourth lens element is f4, and the following condition is satisfied: $1.25 < f2/f4 < 2.29$, which can balance the refractive power of the optical imaging lens assembly, so that it will be favorable to reduce the sensitivity to tolerance.

Preferably, the Abbe number of the second lens element is V2, the Abbe number of the fourth lens element is V4, and the following condition is satisfied: $18 < V4-V2 < 38$, it will be favorable to correct the chromatic aberration of the optical imaging lens assembly.

Preferably, half of the maximal field of view of the optical imaging lens assembly is HFOV, and the following condition is satisfied: $1/|\tan(HFOV)| < 1.19$, which can obtain larger shooting range by providing wider angle of view.

Preferably, the distance from the object-side surface of the first lens element to the image plane along the optical axis is TTL, half of the maximum diagonal imaging height of the optical imaging lens assembly is ImgH, and the following condition is satisfied: $TTL/ImgH < 1.68$, it can maintain the objective of miniaturization of the optical imaging lens assembly, so as to be used in light-weight portable electronic products.

According to another aspect of the present invention, an optical imaging lens assembly comprises an aperture stop and an optical assembly, the optical assembly comprises, in order from the object side to the image side: a first lens element with a positive refractive power having an aspheric object-side surface being convex near the optical axis and an aspheric image-side surface being convex near the optical axis, the first lens element being made of plastic material; a second lens element with a negative refractive power having an aspheric object-side surface being concave near the optical axis and an aspheric image-side surface being convex near the optical axis; a third lens element with a positive refractive power having an aspheric object-side surface being concave near the optical axis and an aspheric image-side surface being convex near the optical axis, the third lens element being made of plastic material; a fourth lens element with a negative refractive power having an aspheric object-side surface being convex near the optical axis and an aspheric image-side surface being concave near the optical axis, the fourth lens element being made of plastic material, at least one inflection point being formed on the object-side surface and the image-side surface of the fourth lens element.

Wherein the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, and the following conditions are satisfied:

$$-0.65<(R3-R4)/(R3+R4)<-0.57;$$

$$0.51<(R5-R6)/(R5+R6)<0.71.$$

If (R3−R4)/(R3+R4) satisfies the above condition, it will be favorable to correct the spherical aberration of the optical imaging lens assembly.

If (R5−R6)/(R5+R6) satisfies the above condition, it will be favorable to correct the aberrations and reduce the track length of the optical imaging lens assembly.

Preferably, the central thickness of the first lens element is CT1, the central thickness of the third lens element is CT3, the distance along the optical axis between the object-side surface of the first lens element and the image-side surface of the fourth lens element is TD, and the following condition is satisfied: 0.45<(CT1+CT3)/TD<0.67, so that the thickness of the lens elements will be more proper, which can distribute the positive refractive power of the optical imaging lens assembly effectively, so as to balance the image quality and the sensitivity.

Preferably, the central thickness of the second lens element is CT2, the central thickness of the fourth lens element is CT4, the distance along the optical axis between the object-side surface of the first lens element and the image-side surface of the fourth lens element is TD, and the following condition is satisfied: 0.23<(CT2+CT4)/TD<0.35, it can maintain the objective of miniaturization of the optical imaging lens assembly and it will be favorable to reduce the peripheral astigmatism and distortion.

Preferably, the f-number of the optical imaging lens assembly is Fno, and the following condition is satisfied: 2.0≤Fno≤2.4, it can increase the incident light with respect to the lens elements, so as to improve the image contrast.

Preferably, the focal length of the first lens element is f1, the focal length of the second lens element is f2, and the following condition is satisfied: −0.82<f1/f2<−0.58, it will be favorable to enlarge the field of view and can better control the aberrations of the optical imaging lens assembly.

Preferably, the focal length of the second lens element is f2, the focal length of the fourth lens element is f4, and the following condition is satisfied: 1.21<f2/f4<2.42, which can balance the refractive power of the optical imaging lens assembly, so that it will be favorable to reduce the sensitivity to tolerance. Preferably, the Abbe number of the second lens element is V2, the Abbe number of the fourth lens element is V4, and the following condition is satisfied: 18<V4−V2<38, it will be favorable to correct the chromatic aberration of the optical imaging lens assembly.

Preferably, half of the maximal field of view of the optical imaging lens assembly is HFOV, and the following condition is satisfied: 1/|tan(HFOV)|<1.19, which can obtain larger shooting range by providing wider angle of view.

Preferably, the distance from the object-side surface of the first lens element to the image plane along the optical axis is TTL, half of the maximum diagonal imaging height of the optical imaging lens assembly is ImgH, and the following condition is satisfied: TTL/ImgH<1.68, it can maintain the objective of miniaturization of the optical imaging lens assembly, so as to be used in light-weight portable electronic products.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
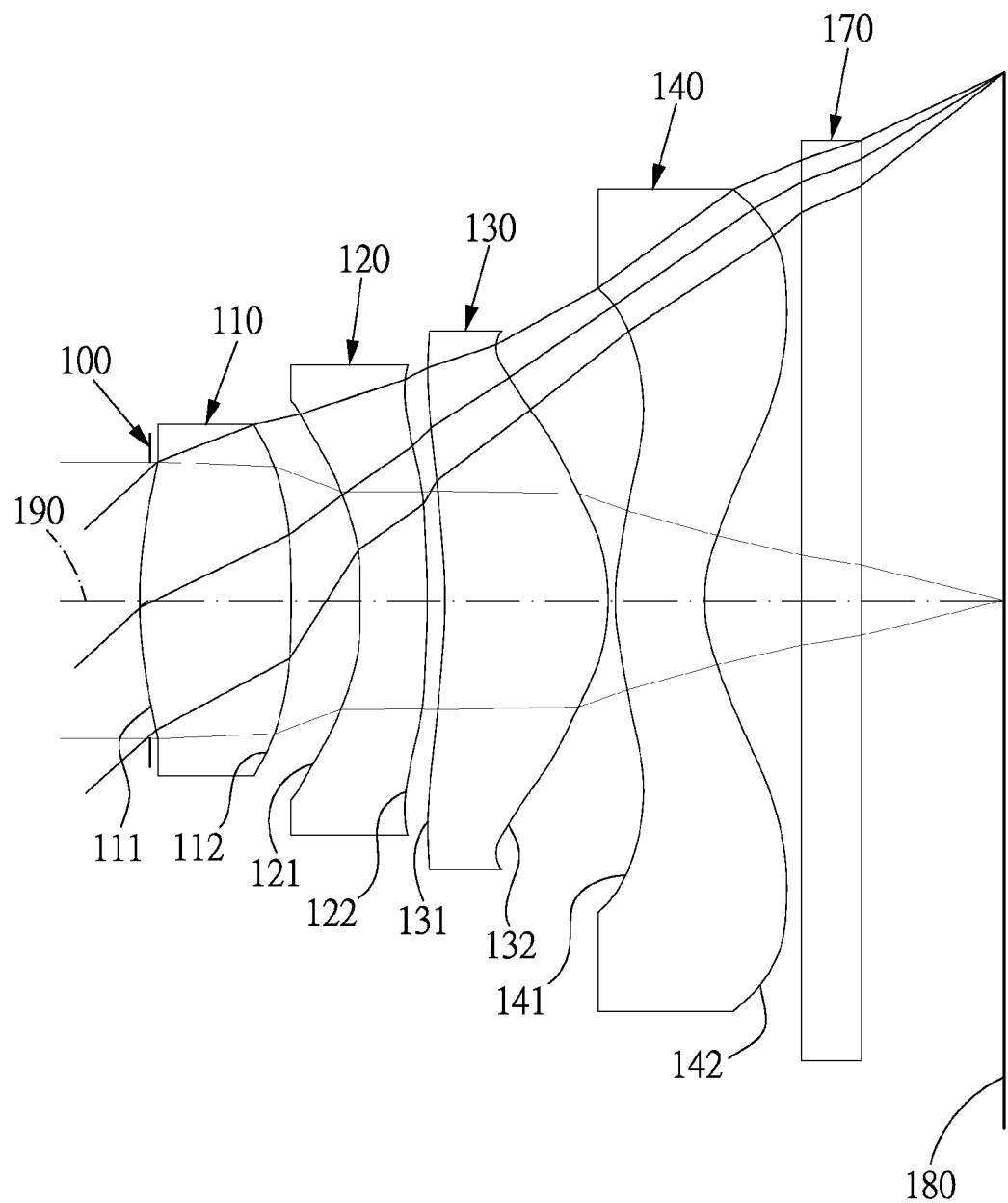
FIG. 1A shows an optical imaging lens assembly in accordance with a first embodiment of the present invention.
Figure 1B:
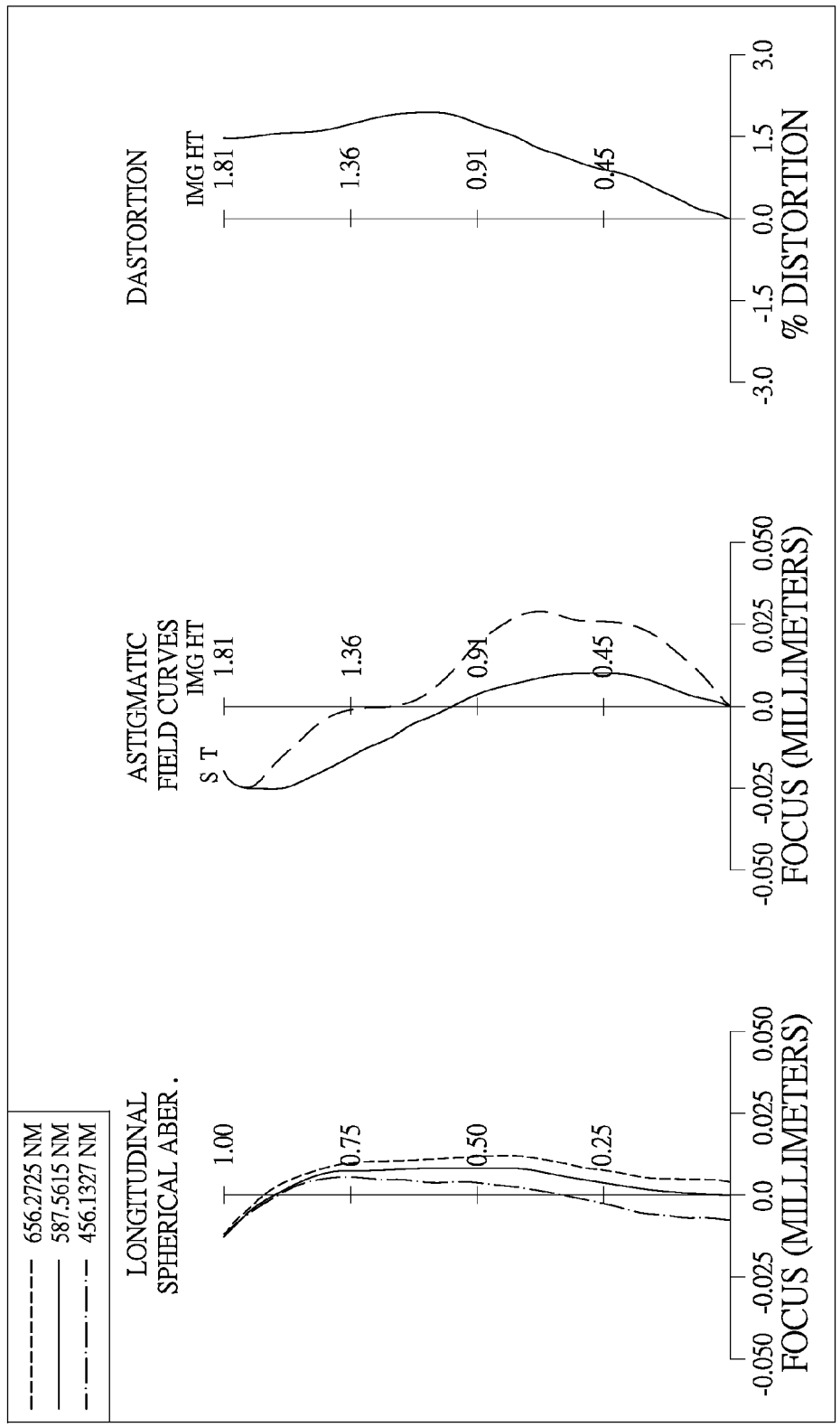
FIG. 1B shows the longitudinal spherical aberration curve, the astigmatic field curve and the distortion curve of the first embodiment of the present invention.

FIG. 1A shows an optical imaging lens assembly in accordance with a first embodiment of the present invention, and FIG. 1B shows, in order from left to right, the longitudinal spherical aberration curves, the astigmatic field curves, and the distortion curve of the first embodiment of the present invention. An optical imaging lens assembly in accordance with the first embodiment of the present invention comprises an aperture stop 100 and an optical assembly. The optical assembly comprises, in order from an object side to an image side: a first lens element 110, a second lens element 120, a third lens element 130, a fourth lens element 140, an IR cut filter 170 and an image plane 180, wherein the optical imaging lens assembly has a total of four lens elements with refractive power. The aperture stop 100 is located between an image-side surface 112 of the first lens element 110 and an object to be photographed.

The first lens element 110 with a positive refractive power has an object-side surface 111 being convex near an optical axis 190 and the image-side surface 112 being convex near the optical axis 190, both the object-side and image-side surfaces 111, 112 are aspheric, and the first lens element 110 is made of plastic material.

The second lens element 120 with a negative refractive power has an object-side surface 121 being concave near the optical axis 190 and an image-side surface 122 being concave near the optical axis 190, both the object-side and image-side surfaces 121, 122 are aspheric, and the second lens element 120 is made of plastic material.

The third lens element 130 with a positive refractive power has an object-side surface 131 being concave near the optical axis 190 and an image-side surface 132 being convex near the optical axis 190, both the object-side and image-side surfaces 131, 132 are aspheric, the third lens element 130 is made of plastic material.

The fourth lens element 140 with a negative refractive power has an object-side surface 141 being convex near the optical axis 190 and an image-side surface 142 being concave near the optical axis 190, both the object-side and image-side surfaces 141, 142 are aspheric, the fourth lens element 140 is made of plastic material, and more than one inflection point is formed on the object-side surface 141 and the image-side surface 142 of the fourth lens element 140.

The IR cut filter 170 made of glass is located between the fourth lens element 140 and the image plane 180 and has no influence on the focal length of the optical imaging lens assembly.

The equation for the aspheric surface profiles of the first embodiment is expressed as follows:

$$z(h) = \frac{ch^2}{1+\sqrt{1-(1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis 190 relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis 190;

k represents the conic constant;

$A_4, A_6, A_8, A_{10}, A_{12}, A_{14} \ldots$ : represent the high-order aspheric coefficients.

In the first embodiment of the present optical imaging lens assembly, the focal length of the optical imaging lens assembly is f, the f-number of the optical imaging lens assembly is Fno, half of the maximal field of view of the optical imaging lens assembly is HFOV, and the following conditions are satisfied:

f=1.96 mm, Fno=2.07, and HFOV=42.2 degrees.

In the first embodiment of the present optical imaging lens assembly, the radius of curvature of the object-side surface 121 of the second lens element 120 is R3, the radius of curvature of the image-side surface 122 of the second lens element 120 is R4, and the following condition is satisfied:

(R3−R4)/(R3+R4)=−0.60.

In the first embodiment of the present optical imaging lens assembly, the radius of curvature of the object-side surface 131 of the third lens element 130 is R5, the radius of curvature of the image-side surface 132 of the third lens element 130 is R6, and the following condition is satisfied:

(R5−R6)/(R5+R6)=0.60.

In the first embodiment of the present optical imaging lens assembly, the central thickness of the first lens element 110 is CT1, the central thickness of the third lens element 130 is CT3, the distance along the optical axis between the object-side surface 111 of the first lens element 110 and the image-side surface 142 of the fourth lens element 140 is TD, and the following condition is satisfied:

(CT1+CT3)/TD=0.56.

In the first embodiment of the present optical imaging lens assembly, the central thickness of the second lens element 120 is CT2, the central thickness of the fourth lens element 140 is CT4, the distance along the optical axis between the object-side surface 111 of the first lens element 110 and the image-side surface 142 of the fourth lens element 140 is TD, and the following condition is satisfied:

(CT2+CT4)/TD=0.27.

In the first embodiment of the present optical imaging lens assembly, the focal length of the first lens element 110 is f1, the focal length of the second lens element 120 is f2, and the following condition is satisfied:

f1/f2=−0.70.

In the first embodiment of the present optical imaging lens assembly, the focal length of the second lens element 120 is f2, the focal length of the fourth lens element 140 is f4, and the following condition is satisfied:

f2/f4=1.54.

In the first embodiment of the present optical imaging lens assembly, the Abbe number of the second lens element 120 is V2, the Abbe number of the fourth lens element 140 is V4, and the following condition is satisfied:

V4−V2=33.3.

In the first embodiment of the present optical imaging lens assembly, half of the maximal field of view of the optical imaging lens assembly is HFOV, and the following condition is satisfied:

1/|tan(HFOV)|=1.10.

In the first embodiment of the present optical imaging lens assembly, the distance from the object-side surface 111 of the first lens element 110 to the image plane 180 along the optical axis 190 is TTL, half of the maximum diagonal imaging height of the optical imaging lens assembly is ImgH, and the following condition is satisfied:

TTL/ImgH=1.643.

The detailed optical data of the first embodiment is shown in Table 1, and the aspheric surface data is shown in Table 2.

TABLE 1

(Embodiment 1)
f(focal length) = 1.96 mm, Fno = 2.07, HFOV = 42.2 deg.

| Surface | | Curvature Radius | Thickness | Material | index | Abbe # | Focal length |
|---|---|---|---|---|---|---|---|
| 0 | Object | Plane | Infinity | | | | |
| 1 | Aperture stop | Plane | −0.03 | | | | |
| 2 | Lens 1 | 1.675(ASP) | 0.521 | Plastic | 1.544 | 55.9 | 2.02 |
| 3 | | −2.863(ASP) | 0.242 | | | | |
| 4 | Lens 2 | −1.354(ASP) | 0.220 | Plastic | 1.641 | 22.6 | −2.88 |
| 5 | | −5.417(ASP) | 0.061 | | | | |
| 6 | Lens 3 | −2.330(ASP) | 0.568 | Plastic | 1.544 | 55.9 | 1.29 |
| 7 | | −0.586(ASP) | 0.030 | | | | |
| 8 | Lens 4 | 1.064(ASP) | 0.307 | Plastic | 1.544 | 55.9 | −1.87 |
| 9 | | 0.467(ASP) | 0.334 | | | | |
| 10 | IR-filter | Plane | 0.21 | Glass | 1.517 | 64.2 | — |
| 11 | | Plane | 0.49 | | | | |
| 12 | Image | Plane | | | | | |

TABLE 2

Aspheric Coefficients

| | Surface # | | | |
|---|---|---|---|---|
| | 2 | 3 | 4 | 5 |
| K = | 9.0774E+00 | 5.4019E+00 | 2.5828E+00 | 1.5763E+00 |
| A4 = | −3.8675E−01 | −4.9383E−01 | −1.0155E+00 | −3.9558E−01 |
| A6 = | −1.3423E+00 | 1.3729E−01 | 2.3223E+00 | 7.1735E−01 |
| A8 = | 1.3510E+01 | −1.2249E+00 | −4.6145E−01 | −9.1076E−02 |
| A10 = | −1.5530E+02 | 7.4748E−01 | 5.2054E+00 | 7.5475E−02 |
| A12 = | 6.8126E+02 | 5.0834E+00 | −1.6720E+01 | −9.8254E−01 |
| A14 = | −1.2385E+03 | −9.9423E+00 | 1.8969E+01 | 1.0543E+00 |

| | Surface # | | | |
|---|---|---|---|---|
| | 6 | 7 | 8 | 9 |
| K = | 6.1002E+00 | −4.0384E+00 | −8.2663E−01 | −3.7633E+00 |
| A4 = | 7.5047E−01 | −4.0471E−01 | −7.2555E−01 | −2.6994E−01 |
| A6 = | −1.7292E+00 | 8.4506E−01 | 3.2656E−01 | 1.6378E−01 |
| A8 = | 1.6367E+00 | −1.1488E+00 | 3.8321E−02 | −9.2497E−02 |
| A10 = | 1.0298E+00 | 2.0128E−01 | −4.4994E−01 | 3.0534E−02 |
| A12 = | −3.1069E+00 | 1.2217E+00 | 5.4729E−01 | −2.1498E−03 |
| A14 = | 2.4622E+00 | −5.7702E−01 | −2.2192E−01 | −1.4386E−03 |

The units of the radius of curvature, the thickness and the focal length in table 1 are expressed in mm, in the tables 1 and 2, the surface numbers 2-9 represent the surfaces sequentially arranged from the object-side to the image-side along the optical axis, and in table 2, k represents the conic coefficient of the equation of the aspheric surface profiles, and $A_4$, $A_6$, $A_8$, $A_{10}$, $A_{12}$, $A_{14}$ . . . : represent the high-order aspheric coefficients arranging from the 4th order to the 14th order. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
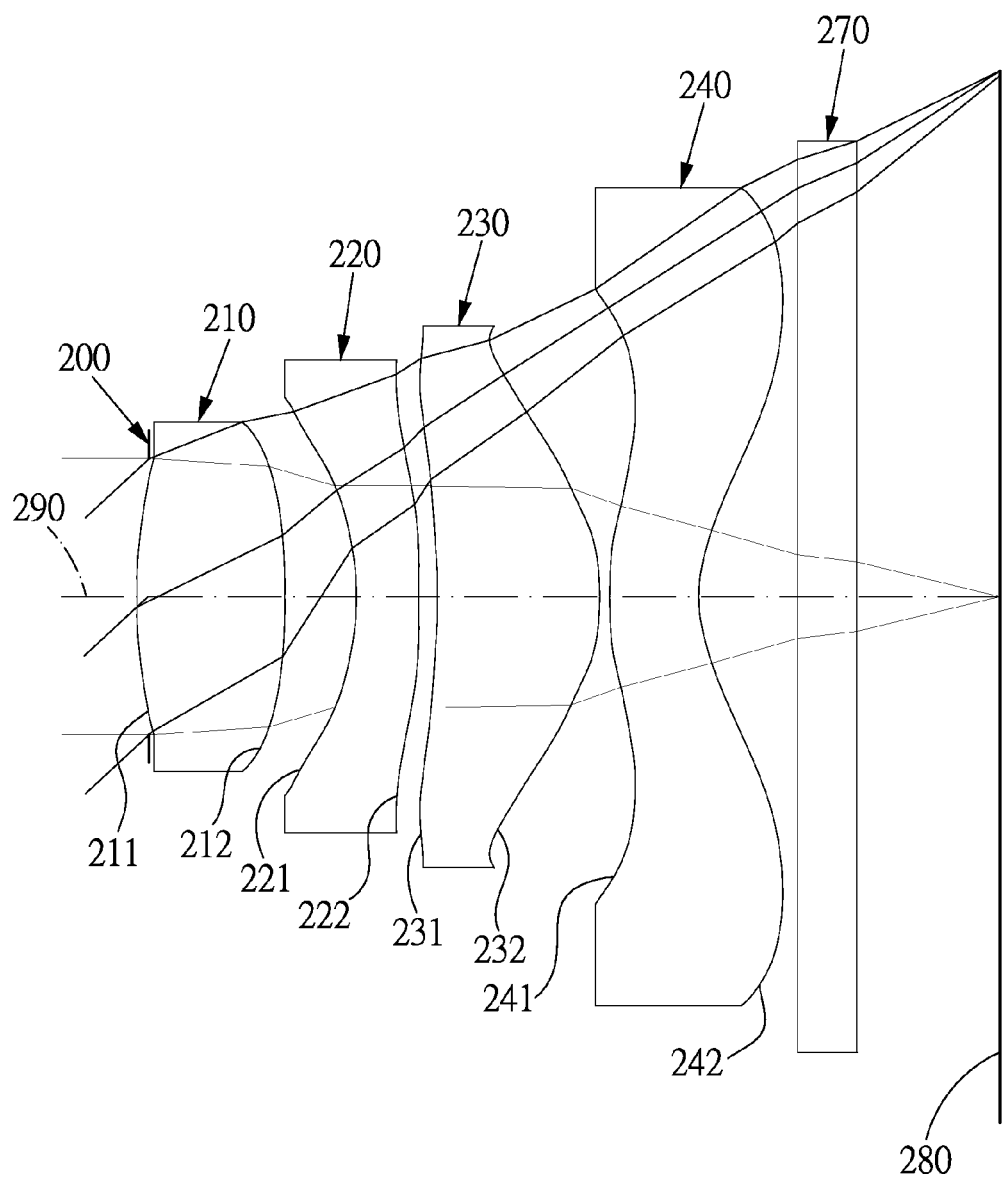
FIG. 2A shows an optical imaging lens assembly in accordance with a second embodiment of the present invention.
Figure 2B:
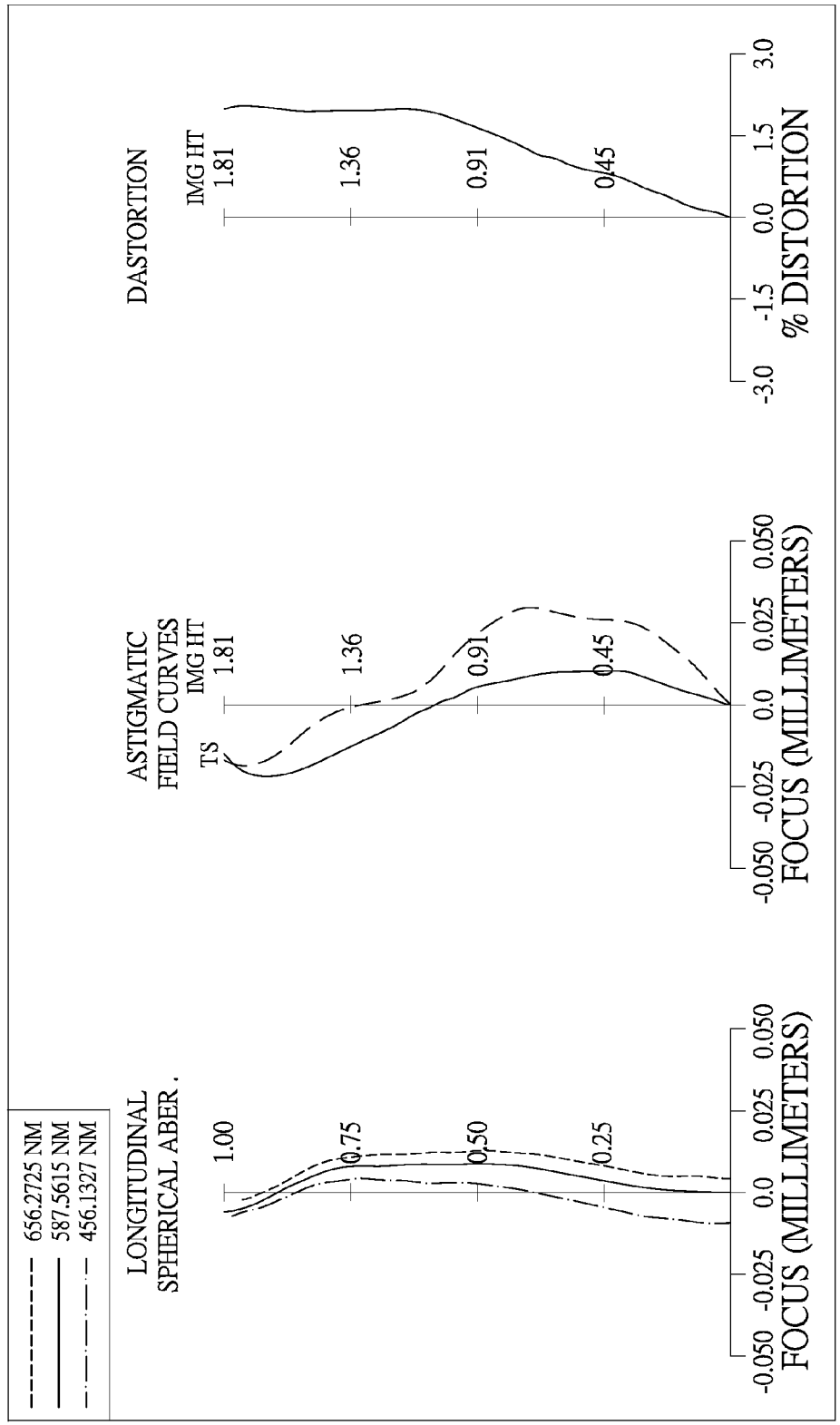
FIG. 2B shows the longitudinal spherical aberration curve, the astigmatic field curve and the distortion curve of the second embodiment of the present invention.

FIG. 2A shows an optical imaging lens assembly in accordance with a second embodiment of the present invention, and FIG. 2B shows, in order from left to right, the longitudinal spherical aberration curves, the astigmatic field curves, and the distortion curve of the second embodiment of the present invention. An optical imaging lens assembly in accordance with the second embodiment of the present invention comprises an aperture stop 200 and an optical assembly. The optical assembly comprises, in order from an object side to an image side: a first lens element 210, a second lens element 220, a third lens element 230, a fourth lens element 240, an IR cut filter 270 and an image plane 280, wherein the optical imaging lens assembly has a total of four lens elements with refractive power. The aperture stop 200 is located between an image-side surface 212 of the first lens element 210 and an object to be photographed.

The first lens element 210 with a positive refractive power has an object-side surface 211 being convex near an optical axis 290 and the image-side surface 212 being convex near the optical axis 290, both the object-side and image-side surfaces 211, 212 are aspheric, and the first lens element 210 is made of plastic material.

The second lens element 220 with a negative refractive power has an object-side surface 221 being concave near the optical axis 290 and an image-side surface 222 being concave near the optical axis 290, both the object-side and image-side surfaces 221, 222 are aspheric, and the second lens element 220 is made of plastic material.

The third lens element 230 with a positive refractive power has an object-side surface 231 being concave near the optical axis 290 and an image-side surface 232 being convex near the optical axis 290, both the object-side and image-side surfaces 231, 232 are aspheric, the third lens element 230 is made of plastic material.

The fourth lens element 240 with a negative refractive power has an object-side surface 241 being convex near the optical axis 290 and an image-side surface 242 being concave near the optical axis 290, both the object-side and image-side surfaces 241, 242 are aspheric, the fourth lens element 240 is made of plastic material, and more than one inflection point is formed on the object-side surface 241 and the image-side surface 242 of the fourth lens element 240.

The IR cut filter 270 made of glass is located between the fourth lens element 240 and the image plane 280 and has no influence on the focal length of the optical imaging lens assembly.

The detailed optical data of the second embodiment is shown in Table 3 and the aspheric surface data is shown in Table 4 below.

TABLE 3

(Embodiment 2)
f(focal length) = 1.98 mm, Fno = 2.1, HFOV = 41.8 deg.

| Surface | | Curvature Radius | Thickness | Material | index | Abbe # | Focal length |
|---|---|---|---|---|---|---|---|
| 0 | Object | Plane | Infinity | | | | |
| 1 | Aperture stop | Plane | −0.045 | | | | |
| 2 | Lens 1 | 1.675(ASP) | 0.509 | Plastic | 1.544 | 55.9 | 2.09 |
| 3 | | −3.167(ASP) | 0.251 | | | | |
| 4 | Lens 2 | −1.347(ASP) | 0.220 | Plastic | 1.641 | 22.6 | −3.25 |
| 5 | | −4.042(ASP) | 0.058 | | | | |
| 6 | Lens 3 | −2.249(ASP) | 0.568 | Plastic | 1.544 | 55.9 | 1.33 |
| 7 | | −0.596(ASP) | 0.037 | | | | |
| 8 | Lens 4 | 1.085(ASP) | 0.311 | Plastic | 1.535 | 56.3 | −1.86 |
| 9 | | 0.471(ASP) | 0.336 | | | | |
| 10 | IR-filter | Plane | 0.21 | Glass | 1.517 | 64.2 | — |
| 11 | | Plane | 0.49 | | | | |
| 12 | Image | Plane | | | | | |

TABLE 4

Aspheric Coefficients

| | Surface # | | | |
|---|---|---|---|---|
| | 2 | 3 | 4 | 5 |
| K = | 9.0425E+00 | 5.8101E+00 | 2.5337E+00 | 7.9106E+00 |
| A4 = | −3.8038E−01 | −4.8451E−01 | −1.0110E+00 | −3.8246E−01 |
| A6 = | −1.3446E+00 | 1.2673E−01 | 2.2920E+00 | 7.3739E−01 |
| A8 = | 1.3553E+01 | −1.2872E+00 | −4.9530E−01 | −7.1824E−02 |
| A10 = | −1.5488E+02 | 7.1141E−01 | 5.2400E+00 | 7.4569E−02 |
| A12 = | 6.8126E+02 | 5.1500E+00 | −1.6681E+01 | −9.9133E−01 |
| A14 = | −1.2385E+03 | −9.9423E+00 | 1.8969E+01 | 1.0546E+00 |

| | Surface # | | | |
|---|---|---|---|---|
| | 6 | 7 | 8 | 9 |
| K = | 5.6523E+00 | −4.1066E+00 | −8.8061E−01 | −3.7748E+00 |
| A4 = | 7.7067E−01 | −3.9717E−01 | −7.3201E−01 | −2.7248E−01 |
| A6 = | −1.7237E+00 | 8.4106E−01 | 3.3784E−01 | 1.6867E−01 |
| A8 = | 1.6371E+00 | −1.1519E+00 | 3.6457E−02 | −8.9784E−02 |
| A10 = | 1.0412E+00 | 2.0018E−01 | −4.4849E−01 | 2.8915E−02 |
| A12 = | −3.1193E+00 | 1.2201E+00 | 5.4749E−01 | −2.7625E−03 |
| A14 = | 2.4544E+00 | −5.8144E−01 | −2.2109E−01 | −9.4290E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f | 1.98 | (CT2 + CT4)/TD | 0.27 |
| Fno | 2.10 | f1/f2 | −0.64 |
| HFOV | 41.8 | f2/f4 | 1.75 |
| (R3 − R4)/(R3 + R4) | −0.50 | V4 − V2 | 33.7 |
| (R5 − R6)/(R5 + R6) | 0.58 | 1/|tan(HFOV)| | 1.12 |
| (CT1 + CT3)/TD | 0.55 | TTL/ImgH | 1.647 |

Figure 3A:
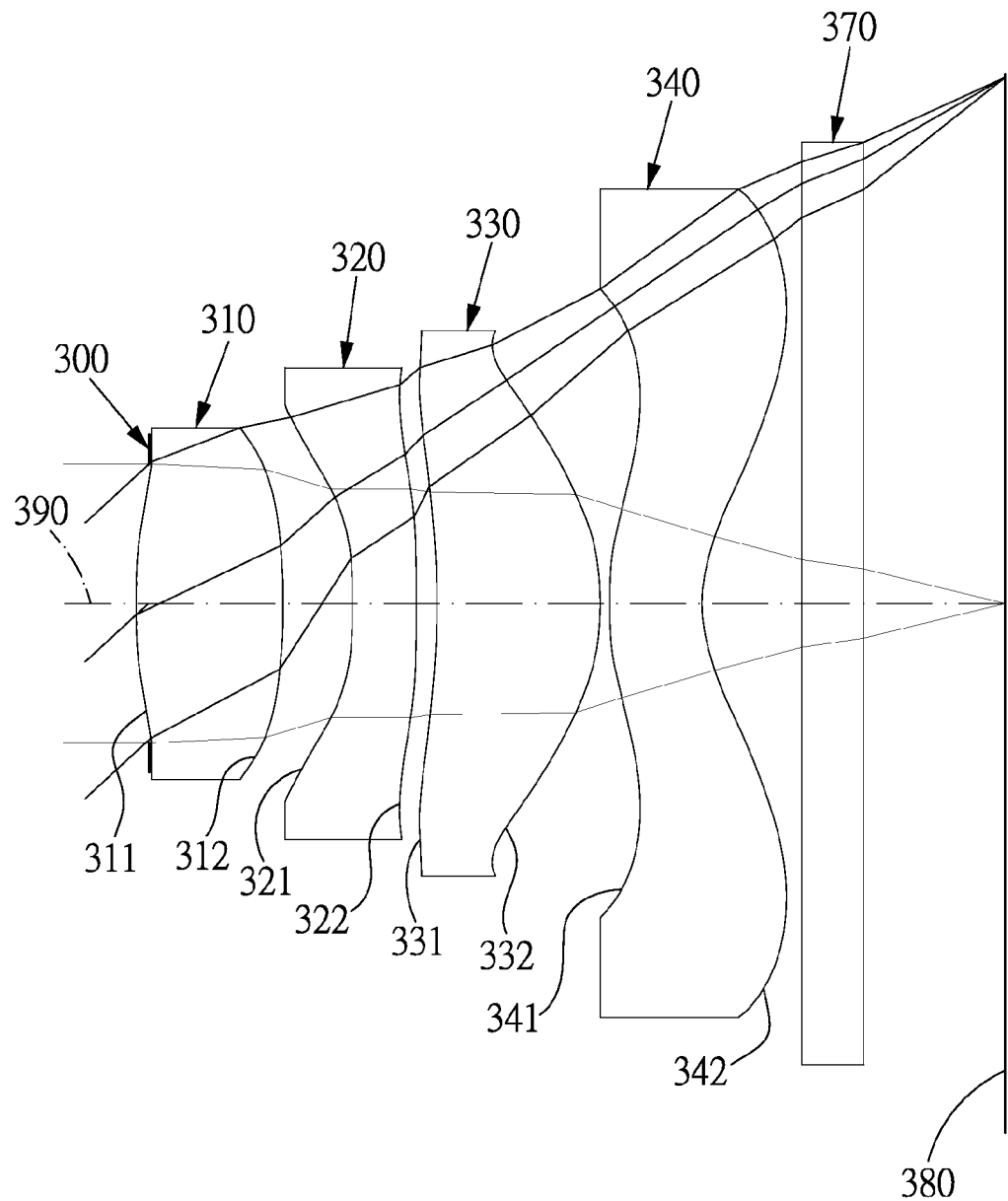
FIG. 3A shows an optical imaging lens assembly in accordance with a third embodiment of the present invention.
Figure 3B:
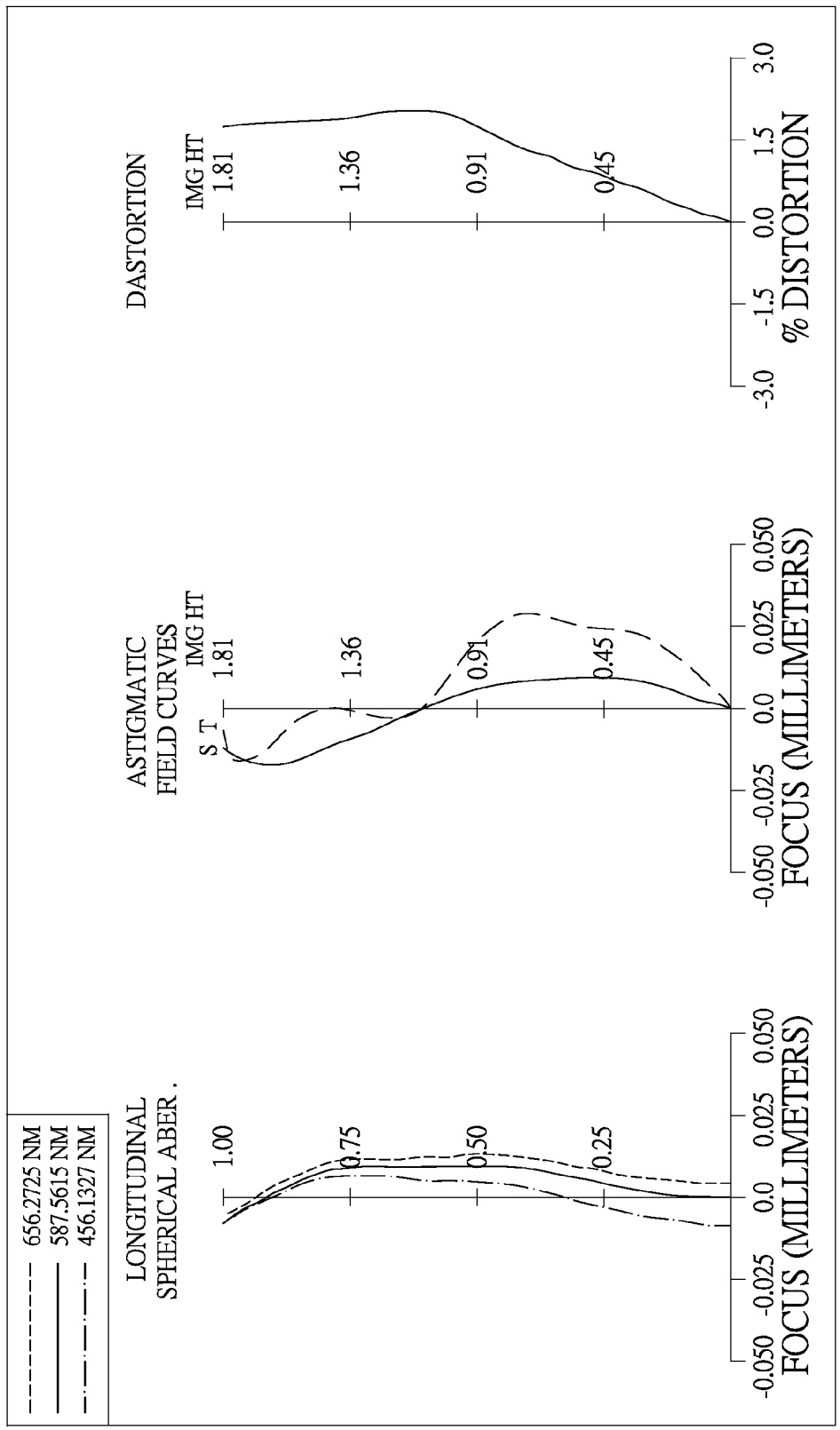
FIG. 3B shows the longitudinal spherical aberration curve, the astigmatic field curve and the distortion curve of the third embodiment of the present invention.

FIG. 3A shows an optical imaging lens assembly in accordance with a third embodiment of the present invention, and FIG. 3B shows, in order from left to right, the longitudinal spherical aberration curves, the astigmatic field curves, and the distortion curve of the third embodiment of the present invention. An optical imaging lens assembly in accordance with the third embodiment of the present invention comprises an aperture stop 300 and an optical assembly. The optical assembly comprises, in order from an object side to an image side: a first lens element 310, a second lens element 320, a third lens element 330, a fourth lens element 340, an IR cut filter 370 and an image plane 380, wherein the optical imaging lens assembly has a total of four lens elements with refractive power. The aperture stop 300 is located between an image-side surface 312 of the first lens element 310 and an object to be photographed.

The first lens element 310 with a positive refractive power has an object-side surface 311 being convex near an optical axis 390 and the image-side surface 312 being convex near the optical axis 390, both the object-side and image-side surfaces 311, 312 are aspheric, and the first lens element 310 is made of plastic material.

The second lens element 320 with a negative refractive power has an object-side surface 321 being concave near the optical axis 390 and an image-side surface 322 being concave near the optical axis 390, both the object-side and image-side surfaces 321, 322 are aspheric, and the second lens element 320 is made of plastic material.

The third lens element 330 with a positive refractive power has an object-side surface 331 being concave near the optical axis 390 and an image-side surface 332 being convex near the optical axis 390, both the object-side and image-side surfaces 331, 332 are aspheric, the third lens element 330 is made of plastic material.

The fourth lens element 340 with a negative refractive power has an object-side surface 341 being convex near the optical axis 390 and an image-side surface 342 being concave near the optical axis 390, both the object-side and image-side surfaces 341, 342 are aspheric, the fourth lens element 340 is made of plastic material, and more than one inflection point is formed on the object-side surface 341 and the image-side surface 342 of the fourth lens element 340.

The IR cut filter 370 made of glass is located between the fourth lens element 340 and the image plane 380 and has no influence on the focal length of the optical imaging lens assembly.

The detailed optical data of the third embodiment is shown in Table 5 and the aspheric surface data is shown in Table 6 below.

TABLE 5

(Embodiment 3)
f(focal length) = 1.97 mm, Fno = 2.08, HFOV = 42.0 deg.

| Surface | | Curvature Radius | Thickness | Material | index | Abbe # | Focal length |
|---|---|---|---|---|---|---|---|
| 0 | Object | Plane | Infinity | | | | |
| 1 | Aperture stop | Plane | −0.043 | | | | |
| 2 | Lens 1 | 1.678(ASP) | 0.501 | Plastic | 1.544 | 55.9 | 2.01 |
| 3 | | −2.836(ASP) | 0.239 | | | | |
| 4 | Lens 2 | −1.370(ASP) | 0.220 | Plastic | 1.641 | 22.6 | −2.99 |
| 5 | | −5.089(ASP) | 0.071 | Plastic | 1.544 | 55.9 | 1.44 |
| 6 | Lens 3 | −2.172(ASP) | 0.570 | | | | |
| 7 | | −0.630(ASP) | 0.030 | Plastic | 1.535 | 55.7 | −2.20 |
| 8 | Lens 4 | 0.968(ASP) | 0.313 | | | | |
| 9 | | 0.475(ASP) | 0.345 | | | | |
| 10 | IR-filter | Plane | 0.21 | Glass | 1.517 | 64.2 | — |
| 11 | | Plane | 0.49 | | | | |
| 12 | Image | Plane | | | | | |

TABLE 6

Aspheric Coefficients

| | Surface # | | | |
|---|---|---|---|---|
| | 2 | 3 | 4 | 5 |
| K = | 9.0652E+00 | 7.2386E+00 | 2.5474E+00 | −2.1848E−01 |
| A4 = | −3.9410E−01 | −5.0730E−01 | −9.9748E−01 | −3.8348E−01 |
| A6 = | −1.3843E+00 | 1.3499E+00 | 2.2818E+00 | 7.5231E−01 |
| A8 = | 1.3452E+01 | −1.2440E+00 | −4.4276E+00 | −8.5089E−02 |
| A10 = | −1.5519E+02 | 8.2907E−01 | 5.3296E+00 | 4.3765E−02 |
| A12 = | 6.8126E+02 | 4.7600E+00 | −1.6658E+01 | −9.8219E−01 |
| A14 = | −1.2385E+03 | −9.9423E+00 | 1.7906E+01 | 1.1566E+00 |

| | Surface # | | | |
|---|---|---|---|---|
| | 6 | 7 | 8 | 9 |
| K = | 5.3088E+00 | −4.1683E+00 | −1.0957E+00 | −3.5058E+00 |
| A4 = | 7.7918E−01 | −3.9891E−01 | −7.4026E−01 | −2.7693E−01 |
| A6 = | −1.7450E+00 | 8.4426E−01 | 3.7403E−01 | 1.6853E−01 |
| A8 = | 1.6426E+00 | −1.1500E+00 | 2.9463E−02 | −9.3039E−02 |
| A10 = | 1.0779E+00 | 1.9614E−01 | −4.7061E−01 | 2.9952E−02 |
| A12 = | −3.0840E+00 | 1.2065E+00 | 5.4626E−01 | −2.0387E−03 |
| A14 = | 2.4938E+00 | −5.8137E−01 | −2.1060E−01 | −1.3616E−03 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f | 1.97 | (CT2 + CT4)/TD | 0.27 |
| Fno | 2.08 | f1/f2 | −0.67 |
| HFOV | 42.0 | f2/f4 | 1.36 |
| (R3 − R4)/(R3 + R4) | −0.58 | V4 − V2 | 33.1 |
| (R5 − R6)/(R5 + R6) | 0.55 | 1/|tan(HFOV)| | 1.11 |
| (CT1 + CT3)/TD | 0.55 | TTL/ImgH | 1.647 |

Figure 4A:
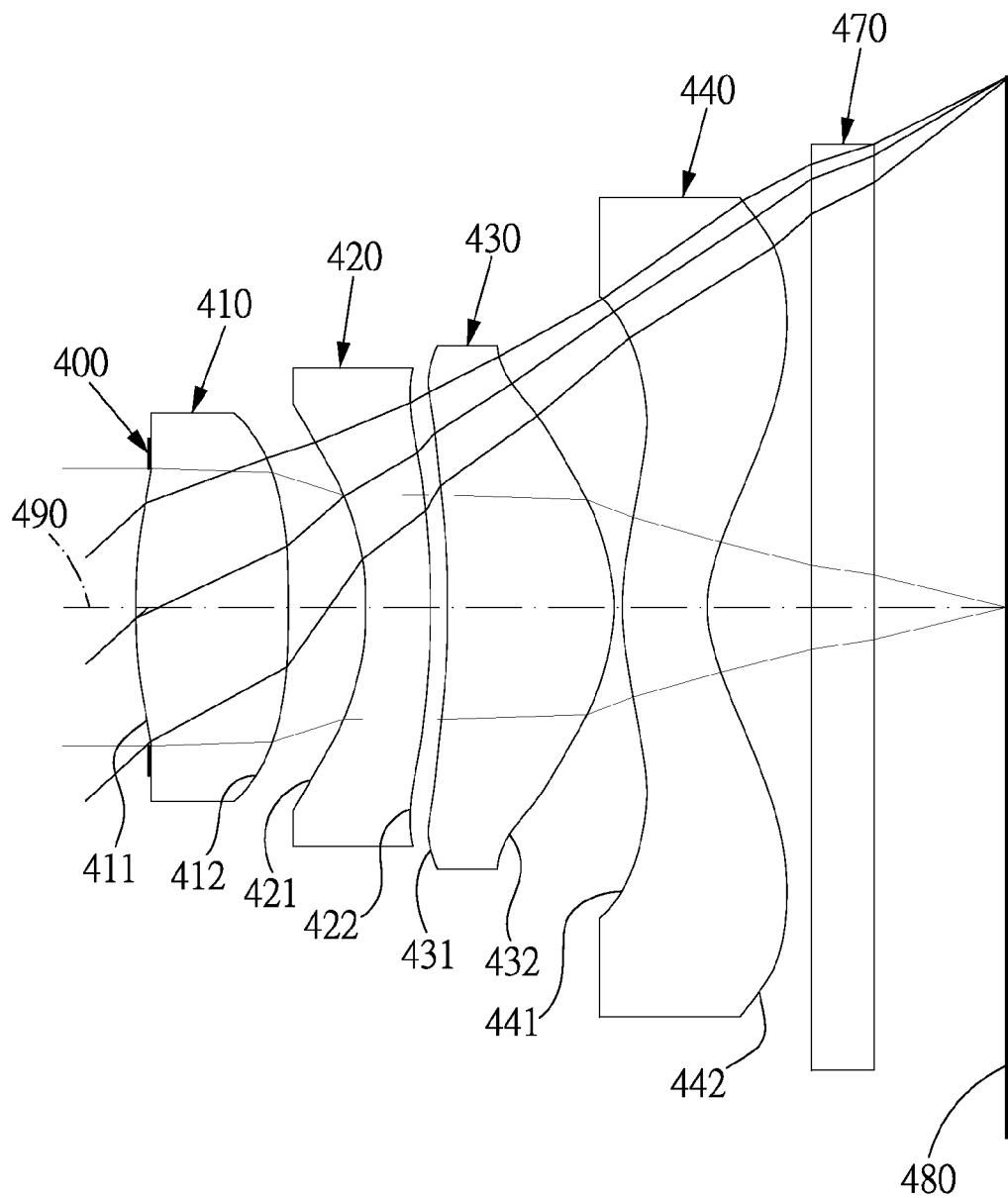
FIG. 4A shows an optical imaging lens assembly in accordance with a fourth embodiment of the present invention.
Figure 4B:
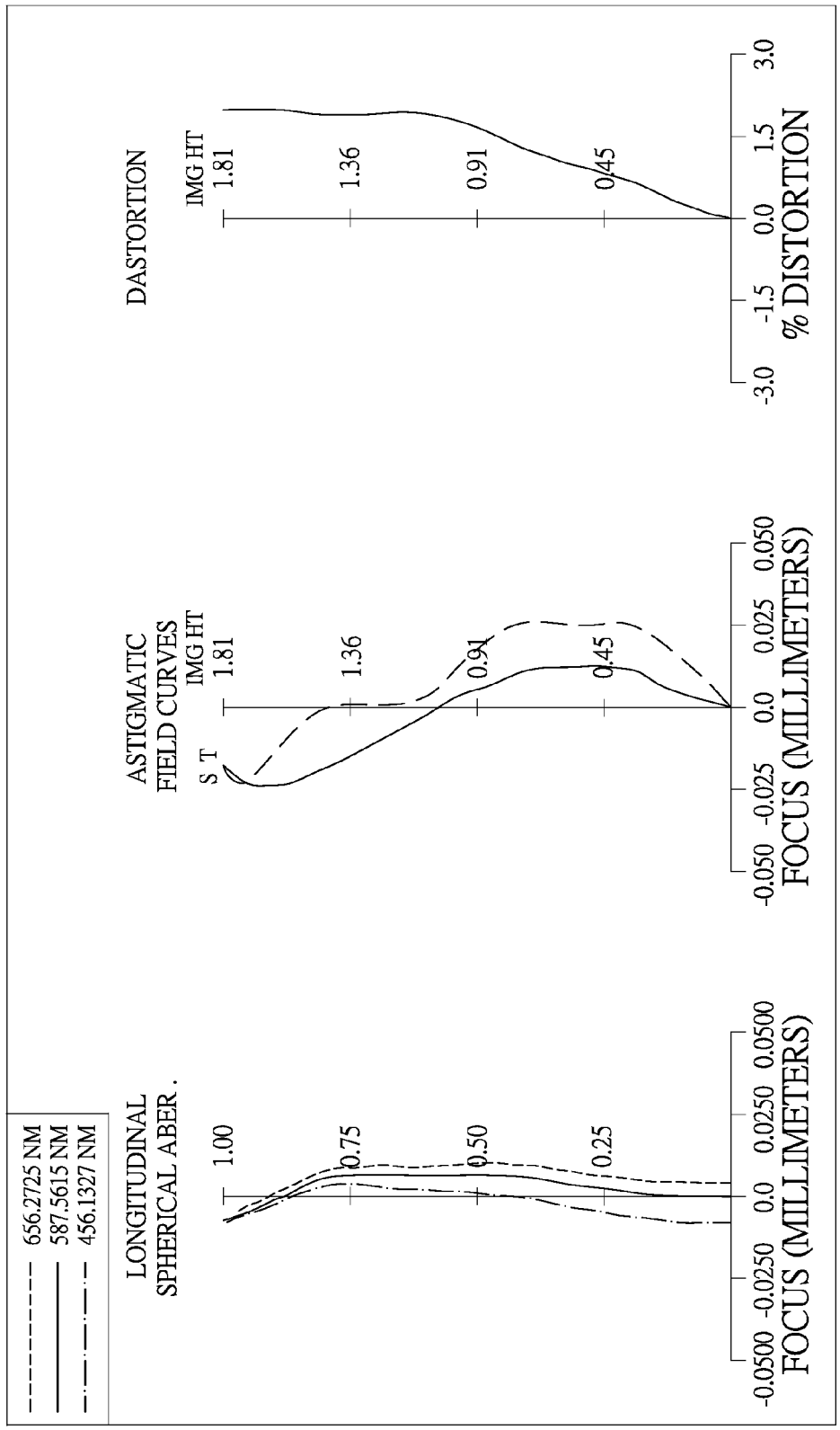
FIG. 4B shows the longitudinal spherical aberration curve, the astigmatic field curve and the distortion curve of the fourth embodiment of the present invention.

FIG. 4A shows an optical imaging lens assembly in accordance with a fourth embodiment of the present invention, and FIG. 4B shows, in order from left to right, the longitudinal spherical aberration curves, the astigmatic field curves, and the distortion curve of the fourth embodiment of the present invention. An optical imaging lens assembly in accordance with the fourth embodiment of the present invention comprises an aperture stop 400 and an optical assembly. The optical assembly comprises, in order from an object side to an image side: a first lens element 410, a second lens element 420, a third lens element 430, a fourth lens element 440, an IR cut filter 470 and an image plane 480, wherein the optical imaging lens assembly has a total of four lens elements with refractive power. The aperture stop 400 is located between an image-side surface 412 of the first lens element 410 and an object to be photographed.

The first lens element 410 with a positive refractive power has an object-side surface 411 being convex near an optical axis 490 and the image-side surface 412 being convex near the optical axis 490, both the object-side and image-side surfaces 411, 412 are aspheric, and the first lens element 410 is made of plastic material.

The second lens element 420 with a negative refractive power has an object-side surface 421 being concave near the optical axis 490 and an image-side surface 422 being concave near the optical axis 490, both the object-side and image-side surfaces 421, 422 are aspheric, and the second lens element 420 is made of plastic material.

The third lens element 430 with a positive refractive power has an object-side surface 431 being concave near the optical axis 490 and an image-side surface 432 being convex near the optical axis 490, both the object-side and image-side surfaces 431, 432 are aspheric, the third lens element 430 is made of plastic material.

The fourth lens element 440 with a negative refractive power has an object-side surface 441 being convex near the optical axis 490 and an image-side surface 442 being concave near the optical axis 490, both the object-side and image-side surfaces 441, 442 are aspheric, the fourth lens element 440 is made of plastic material, and more than one inflection point is formed on the object-side surface 441 and the image-side surface 442 of the fourth lens element 440.

The IR cut filter 470 made of glass is located between the fourth lens element 440 and the image plane 480 and has no influence on the focal length of the optical imaging lens assembly.

The detailed optical data of the fourth embodiment is shown in Table 7 and the aspheric surface data is shown in Table 8 below.

TABLE 7

(Embodiment 4)
f(focal length) = 1.99 mm, Fno = 2.09, HFOV = 41.8 deg.

| Surface | | Curvature Radius | Thickness | Material | index | Abbe # | Focal length |
|---|---|---|---|---|---|---|---|
| 0 | Object | Plane | Infinity | | | | |
| 1 | Aperture stop | Plane | −0.048 | | | | |
| 2 | Lens 1 | 1.676(ASP) | 0.525 | Plastic | 1.544 | 55.9 | 2.03 |
| 3 | | −2.898(ASP) | 0.258 | | | | |
| 4 | Lens 2 | −1.379(ASP) | 0.220 | Plastic | 1.641 | 22.6 | −2.82 |
| 5 | | −5.770(ASP) | 0.059 | | | | |
| 6 | Lens 3 | −2.497(ASP) | 0.582 | Plastic | 1.544 | 55.9 | 1.07 |
| 7 | | −0.512(ASP) | 0.030 | | | | |
| 8 | Lens 4 | 1.177(ASP) | 0.281 | Plastic | 1.544 | 55.9 | −1.36 |
| 9 | | 0.417(ASP) | 0.366 | | | | |
| 10 | IR-filter | Plane | 0.21 | Glass | 1.517 | 64.2 | — |
| 11 | | Plane | 0.49 | | | | |
| 12 | Image | Plane | | | | | |

TABLE 8

Aspheric Coefficients

| Surface # | | | | |
|---|---|---|---|---|
| | 2 | 3 | 4 | 5 |
| K = | 9.0363E+00 | 3.9821E+00 | 2.6019E+00 | 8.8462E+00 |
| A4 = | −3.8477E−01 | −4.7946E−01 | −1.0067E+00 | −4.0381E−01 |
| A6 = | −1.3525E+00 | 1.4370E−01 | 2.3460E+00 | 7.0791E−01 |
| A8 = | 1.3569E+01 | −1.2156E+00 | −4.5829E−01 | −8.6701E−02 |
| A10 = | −1.5466E+02 | 7.8839E−01 | 5.1792E+00 | 9.7930E−02 |
| A12 = | 6.8126E+02 | 5.0834E+00 | −1.6746E+01 | −9.6332E−01 |
| A14 = | −1.2385E+03 | −9.9423E+00 | 1.8969E+01 | 1.0464E+00 |

| Surface # | | | | |
|---|---|---|---|---|
| | 6 | 7 | 8 | 9 |
| K = | 6.7293E+00 | −4.1411E+00 | −6.2737E−01 | −4.0991E+00 |
| A4 = | 7.3392E−01 | −3.9934E−01 | −7.0441E−01 | −2.6822E−01 |
| A6 = | −1.7345E+00 | 8.4821E−01 | 2.9182E−01 | 1.6102E−01 |
| A8 = | 1.6180E+00 | −1.1537E+00 | 3.8787E−02 | −9.1241E−02 |
| A10 = | 9.8328E−01 | 1.9304E−01 | −4.2576E−01 | 3.1466E−02 |
| A12 = | −3.1320E+00 | 1.2149E+00 | 5.4781E−01 | −2.5309E−03 |
| A14 = | 2.4319E+00 | −5.8799E−01 | −2.3172E−01 | −1.5113E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f | 1.99 | (CT2 + CT4)/TD | 0.26 |
| Fno | 2.09 | f1/f2 | −0.72 |
| HFOV | 41.8 | f2/f4 | 2.07 |
| (R3 − R4)/(R3 + R4) | −0.61 | V4 − V2 | 33.3 |
| (R5 − R6)/(R5 + R6) | 0.66 | 1/|tan(HFOV)| | 1.12 |
| (CT1 + CT3)/TD | 0.57 | TTL/ImgH | 1.647 |

Figure 5A:
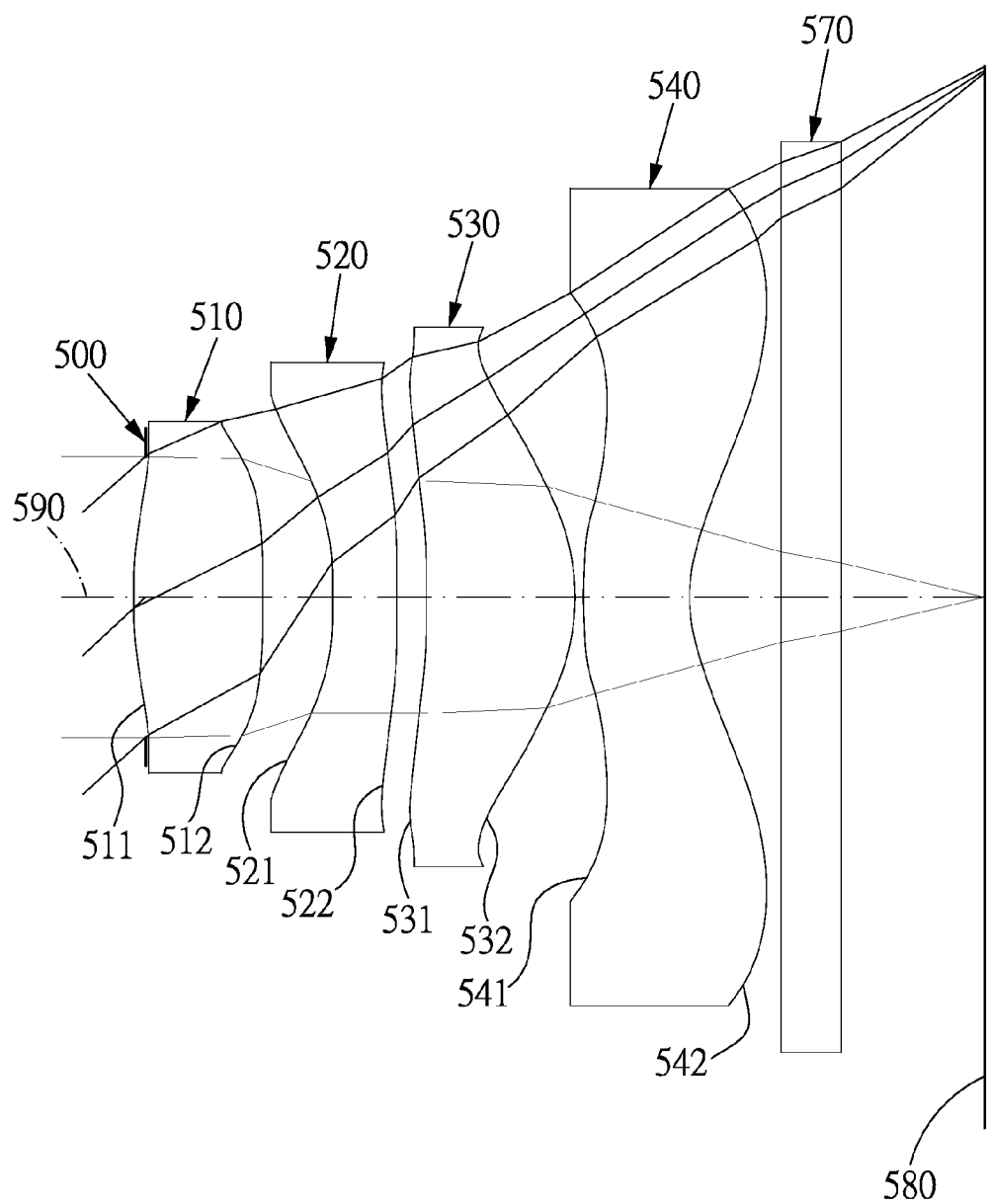
FIG. 5A shows an optical imaging lens assembly in accordance with a fifth embodiment of the present invention.
Figure 5B:
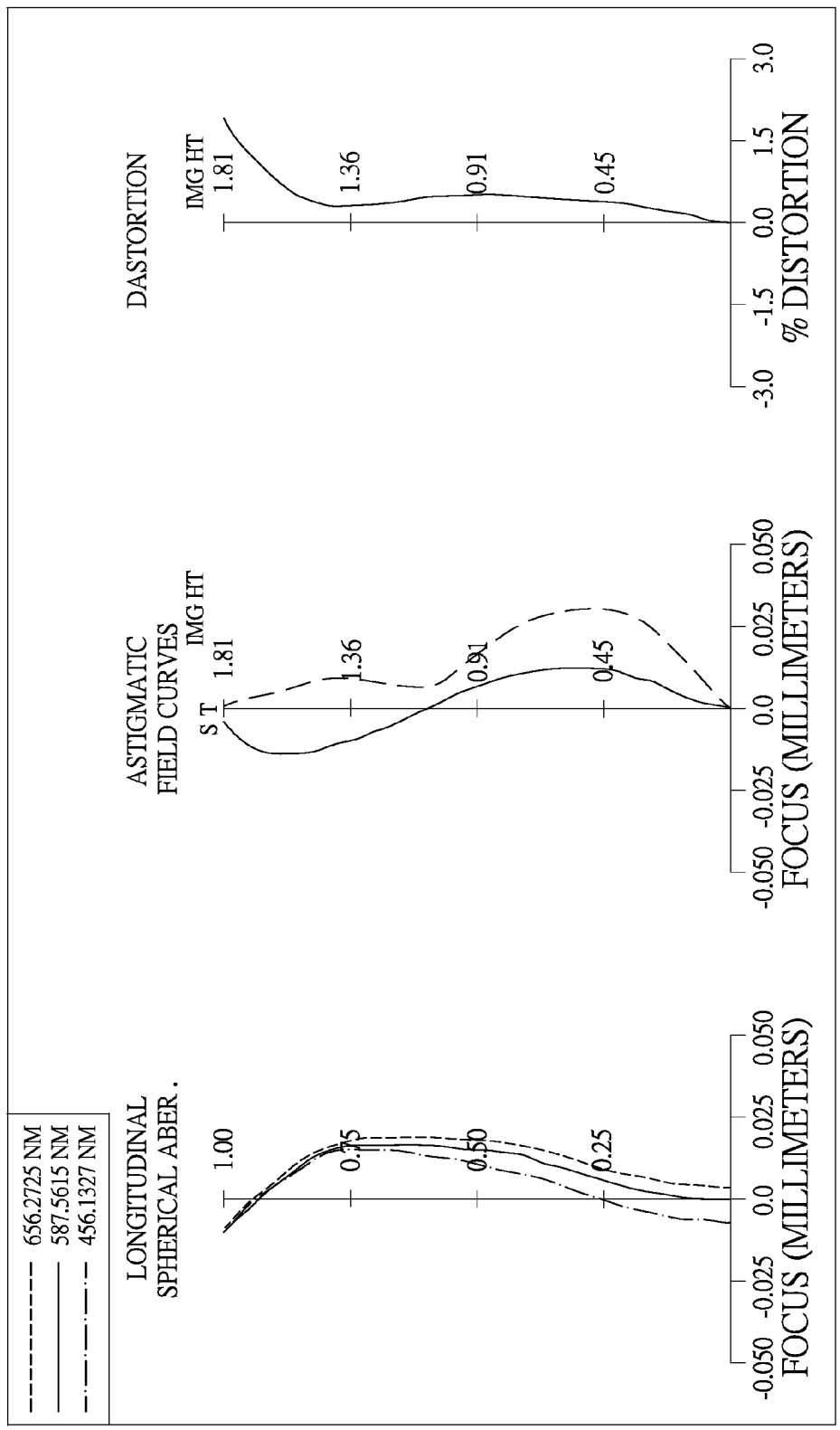
FIG. 5B shows the longitudinal spherical aberration curve, the astigmatic field curve and the distortion curve of the fifth embodiment of the present invention.

FIG. 5A shows an optical imaging lens assembly in accordance with a fifth embodiment of the present invention, and FIG. 5B shows, in order from left to right, the longitudinal spherical aberration curves, the astigmatic field curves, and the distortion curve of the fifth embodiment of the present invention. An optical imaging lens assembly in accordance with the fifth embodiment of the present invention comprises an aperture stop 500 and an optical assembly. The optical assembly comprises, in order from an object side to an image side: a first lens element 510, a second lens element 520, a third lens element 530, a fourth lens element 540, an IR cut filter 570 and an image plane 580, wherein the optical imaging lens assembly has a total of four lens elements with refractive power. The aperture stop 500 is located between an image-side surface 512 of the first lens element 510 and an object to be photographed.

The first lens element 510 with a positive refractive power has an object-side surface 511 being convex near an optical axis 590 and the image-side surface 512 being convex near the optical axis 590, both the object-side and image-side surfaces 511, 512 are aspheric, and the first lens element 510 is made of plastic material.

The second lens element 520 with a negative refractive power has an object-side surface 521 being concave near the optical axis 590 and an image-side surface 522 being concave near the optical axis 590, both the object-side and image-side surfaces 521, 522 are aspheric, and the second lens element 520 is made of plastic material.

The third lens element 530 with a positive refractive power has an object-side surface 531 being concave near the optical axis 590 and an image-side surface 532 being convex near the optical axis 590, both the object-side and image-side surfaces 531, 532 are aspheric, the third lens element 530 is made of plastic material.

The fourth lens element 540 with a negative refractive power has an object-side surface 541 being convex near the optical axis 590 and an image-side surface 542 being concave near the optical axis 590, both the object-side and image-side surfaces 541, 542 are aspheric, the fourth lens element 540 is made of plastic material, and more than one inflection point is formed on the object-side surface 541 and the image-side surface 542 of the fourth lens element 540.

The IR cut filter 570 made of glass is located between the fourth lens element 540 and the image plane 580 and has no influence on the focal length of the optical imaging lens assembly.

The detailed optical data of the fifth embodiment is shown in Table 9 and the aspheric surface data is shown in Table 10 below.

TABLE 9

(Embodiment 5)
f(focal length) = 1.96 mm, Fno = 2.03, HFOV = 42.0 deg.

| Surface | | Curvature Radius | Thickness | Material | index | Abbe # | Focal length |
|---|---|---|---|---|---|---|---|
| 0 | Object | Plane | Infinity | | | | |
| 1 | Aperture stop | Plane | −0.041 | | | | |
| 2 | Lens 1 | 1.687(ASP) | 0.443 | Plastic | 1.544 | 55.9 | 2.01 |
| 3 | | −2.835(ASP) | 0.242 | | | | |
| 4 | Lens 2 | −1.361(ASP) | 0.225 | Plastic | 1.641 | 22.6 | −2.88 |
| 5 | | −5.501(ASP) | 0.093 | | | | |
| 6 | Lens 3 | −2.320(ASP) | 0.516 | Plastic | 1.544 | 55.9 | 1.41 |
| 7 | | −0.624(ASP) | 0.030 | | | | |
| 8 | Lens 4 | 1.187(ASP) | 0.369 | Plastic | 1.535 | 55.7 | −2.06 |
| 9 | | 0.514(ASP) | 0.313 | | | | |
| 10 | IR-filter | Plane | 0.21 | Glass | 1.517 | 64.2 | — |
| 11 | | Plane | 0.49 | | | | |
| 12 | Image | Plane | | | | | |

TABLE 10

Aspheric Coefficients

| Surface # | | | | |
|---|---|---|---|---|
| | 2 | 3 | 4 | 5 |
| K = | 9.0927E+00 | 8.6876E+00 | 2.6325E+00 | −2.6193E+00 |
| A4 = | −4.2540E−01 | −5.1798E−01 | −9.4563E−01 | −3.9125E−01 |
| A6 = | −1.4805E+00 | 7.6398E−02 | 2.3547E−01 | 7.4798E−01 |
| A8 = | 1.3207E+01 | −1.2839E+00 | −3.3513E−01 | −6.9831E−02 |
| A10 = | −1.5499E+02 | 6.3185E−01 | 5.4777E+00 | 6.6406E−02 |
| A12 = | 6.8126E+02 | 4.8393E+00 | −1.6814E+01 | −1.0032E+00 |
| A14 = | −1.2385E+03 | −9.9423E+00 | 1.8969E+01 | 1.1410E+00 |

| Surface # | | | | |
|---|---|---|---|---|
| | 6 | 7 | 8 | 9 |
| K = | 6.0082E+00 | −4.0458E+00 | −5.7212E−01 | −4.2103E+00 |
| A4 = | 7.9217E−01 | −3.5538E−01 | −7.0994E−01 | −2.5643E−01 |
| A6 = | −1.7182E+00 | 8.5775E−01 | 3.4867E−01 | 1.6656E−01 |
| A8 = | 1.6310E+00 | −1.1447E+00 | 3.3745E−02 | −9.3994E−02 |
| A10 = | 1.0176E+00 | 2.1408E−01 | −4.6576E−01 | 2.9158E−02 |
| A12 = | −3.1213E+00 | 1.2252E+00 | 5.3921E−01 | −2.1889E−03 |
| A14 = | 2.4333E+00 | −5.7671E−01 | −2.1226E−01 | −9.4370E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f | 1.96 | (CT2 + CT4)/TD | 0.31 |
| Fno | 2.03 | f1/f2 | −0.70 |
| HFOV | 42.0 | f2/f4 | 1.39 |
| (R3 − R4)/(R3 + R4) | −0.60 | V4 − V2 | 33.1 |
| (R5 − R6)/(R5 + R6) | 0.58 | 1/|tan(HFOV)| | 1.11 |
| (CT1 + CT3)/TD | 0.50 | TTL/ImgH | 1.614 |

Figure 6A:
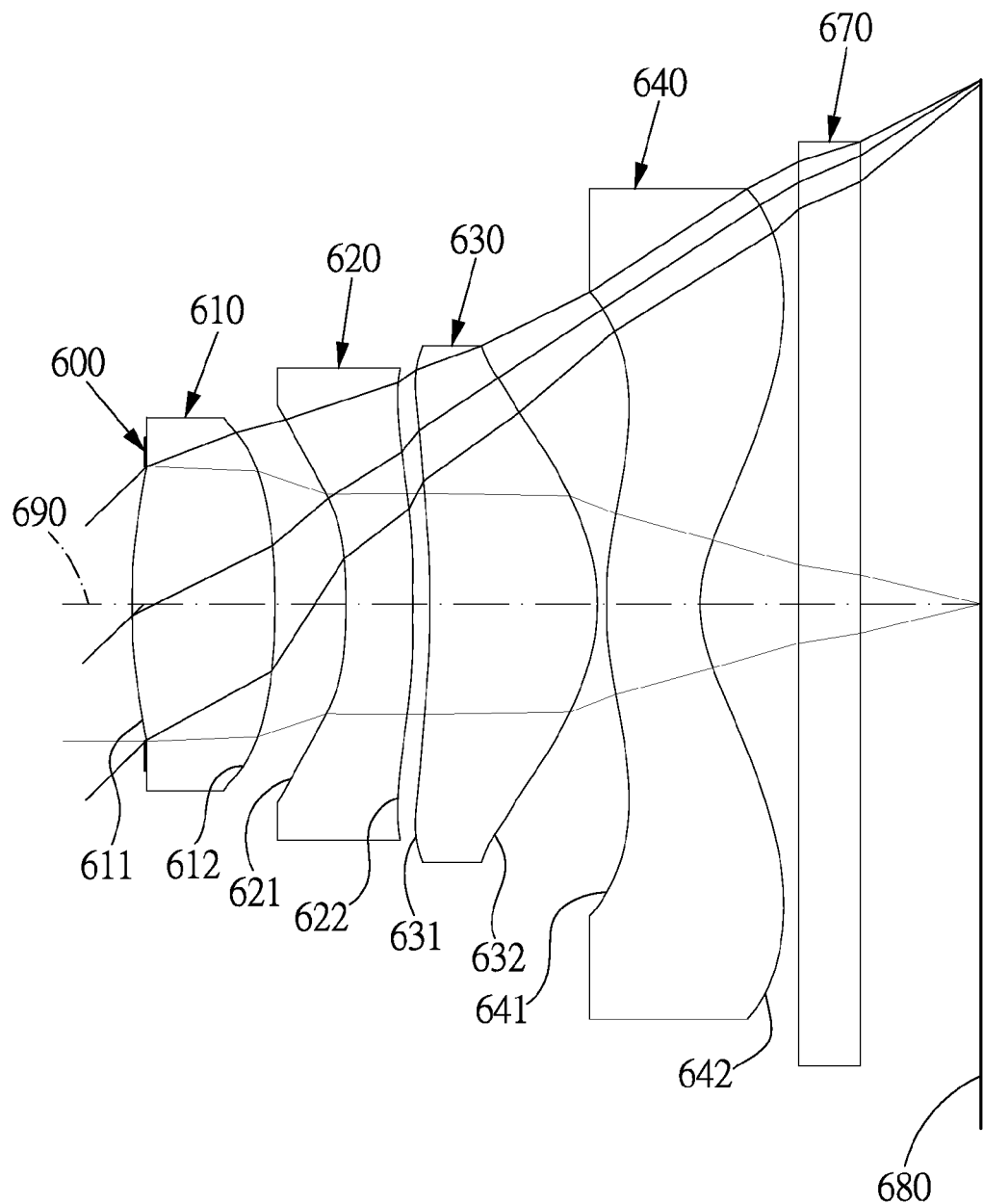
FIG. 6A shows an optical imaging lens assembly in accordance with a sixth embodiment of the present invention.
Figure 6B:
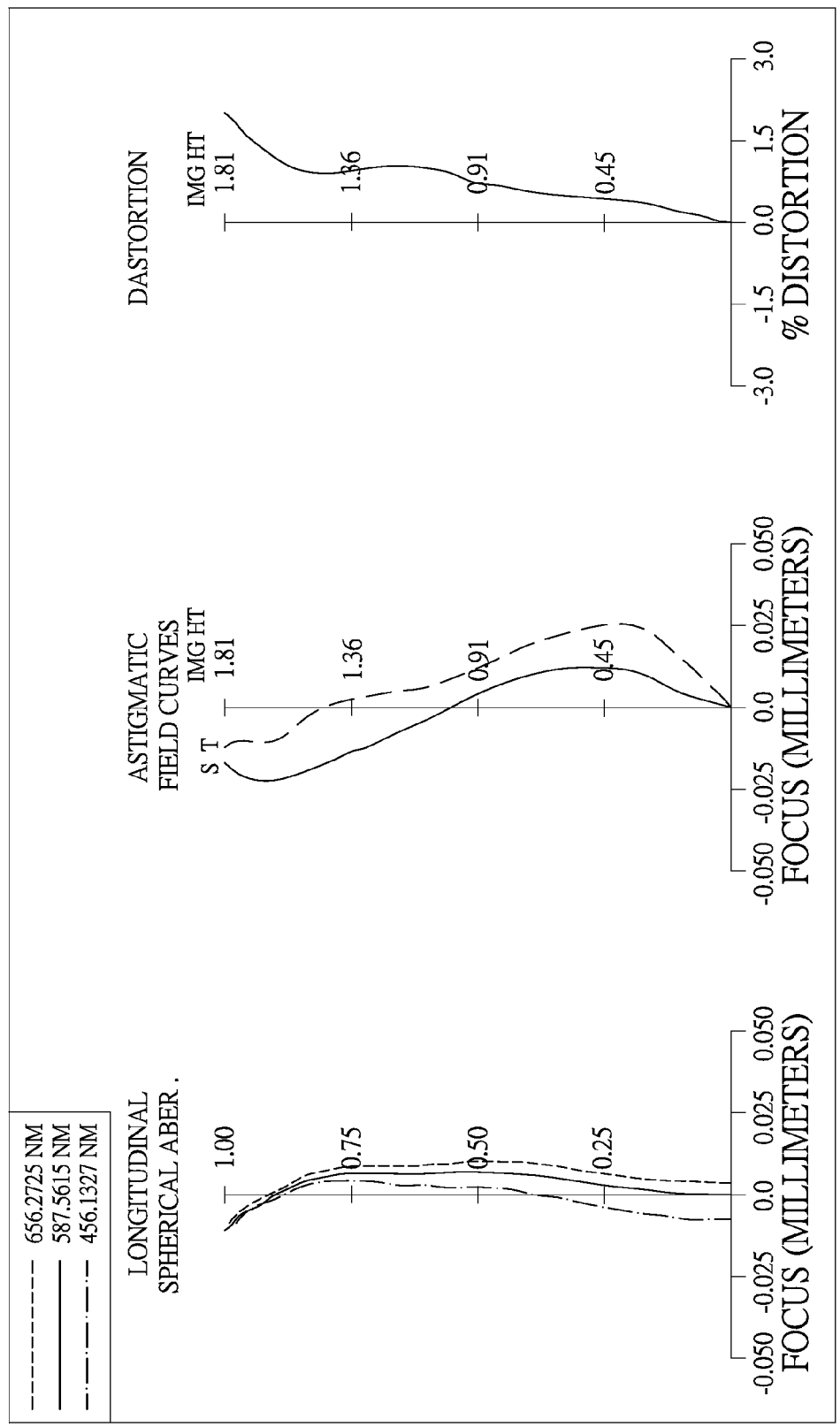
FIG. 6B shows the longitudinal spherical aberration curve, the astigmatic field curve and the distortion curve of the sixth embodiment of the present invention.

FIG. 6A shows an optical imaging lens assembly in accordance with a sixth embodiment of the present invention, and FIG. 6B shows, in order from left to right, the longitudinal spherical aberration curves, the astigmatic field curves, and the distortion curve of the sixth embodiment of the present invention. An optical imaging lens assembly in accordance with the sixth embodiment of the present invention comprises an aperture stop 600 and an optical assembly. The optical assembly comprises, in order from an object side to an image side: a first lens element 610, a second lens element 620, a third lens element 630, a fourth lens element 640, an IR cut filter 670 and an image plane 680, wherein the optical imaging lens assembly has a total of four lens elements with refractive power. The aperture stop 600 is located between an image-side surface 612 of the first lens element 610 and an object to be photographed.

The first lens element 610 with a positive refractive power has an object-side surface 611 being convex near an optical axis 690 and the image-side surface 612 being convex near the optical axis 690, both the object-side and image-side surfaces 611, 612 are aspheric, and the first lens element 610 is made of plastic material.

The second lens element 620 with a negative refractive power has an object-side surface 621 being concave near the optical axis 690 and an image-side surface 622 being concave near the optical axis 690, both the object-side and image-side surfaces 621, 622 are aspheric, and the second lens element 620 is made of plastic material.

The third lens element 630 with a positive refractive power has an object-side surface 631 being concave near the optical axis 690 and an image-side surface 632 being convex near the optical axis 690, both the object-side and image-side surfaces 631, 632 are aspheric, the third lens element 630 is made of plastic material.

The fourth lens element 640 with a negative refractive power has an object-side surface 641 being convex near the optical axis 690 and an image-side surface 642 being concave near the optical axis 690, both the object-side and image-side surfaces 641, 642 are aspheric, the fourth lens element 640 is made of plastic material, and more than one inflection point is formed on the object-side surface 641 and the image-side surface 642 of the fourth lens element 640.

The IR cut filter 670 made of glass is located between the fourth lens element 640 and the image plane 680 and has no influence on the focal length of the optical imaging lens assembly.

The detailed optical data of the sixth embodiment is shown in Table 11 and the aspheric surface data is shown in Table 12 below.

TABLE 11

(Embodiment 6)
f(focal length) = 1.94 mm, Fno = 2.04, HFOV = 42.5 deg.

| Surface | | Curvature Radius | Thickness | Material | index | Abbe # | Focal length |
|---|---|---|---|---|---|---|---|
| 0 | Object | Plane | Infinity | | | | |
| 1 | Aperture stop | Plane | −0.05 | | | | |
| 2 | Lens 1 | 1.672(ASP) | 0.495 | Plastic | 1.544 | 55.9 | 2.00 |
| 3 | | −2.822(ASP) | 0.248 | | | | |
| 4 | Lens 2 | −1.386(ASP) | 0.232 | Plastic | 1.641 | 22.6 | −2.80 |
| 5 | | −5.300(ASP) | 0.058 | | | | |
| 6 | Lens 3 | −2.562(ASP) | 0.590 | Plastic | 1.544 | 55.9 | 1.10 |
| 7 | | −0.525(ASP) | 0.030 | | | | |
| 8 | Lens 4 | 1.284(ASP) | 0.321 | Plastic | 1.544 | 55.9 | −1.40 |
| 9 | | 0.436(ASP) | 0.346 | | | | |
| 10 | IR-filter | Plane | 0.21 | Glass | 1.517 | 64.2 | — |
| 11 | | Plane | 0.49 | | | | |
| 12 | Image | Plane | | | | | |

TABLE 12

Aspheric Coefficients

| | Surface # | | | |
|---|---|---|---|---|
| | 2 | 3 | 4 | 5 |
| K = | 9.0150E+00 | 5.6760E+00 | 2.5449E+00 | −2.1960E+01 |
| A4 = | −3.9900E−01 | −4.9516E−01 | −9.8468E−01 | −3.8484E−01 |
| A6 = | −1.3922E+00 | 1.2704E−01 | 2.3519E−01 | 7.1490E−01 |
| A8 = | 1.3463E+01 | −1.2699E+00 | −4.5754E−01 | −8.3307E−02 |
| A10 = | −1.5539E+02 | 6.6558E−01 | 5.2014E+00 | 9.7980E−02 |
| A12 = | 6.8126E+02 | 5.0834E+00 | −1.6504E+01 | −9.7233E−01 |
| A14 = | −1.2385E+03 | −9.9423E+00 | 1.8969E+01 | 9.9094E−01 |

| | Surface # | | | |
|---|---|---|---|---|
| | 6 | 7 | 8 | 9 |
| K = | 7.0085E+00 | −3.9966E+00 | −8.6885E−02 | −4.2557E+00 |
| A4 = | 7.4911E−01 | −3.7442E−01 | −6.2386E−01 | −2.1908E−01 |
| A6 = | −1.7110E+00 | 8.5381E−01 | 2.4813E−01 | 1.3971E−01 |
| A8 = | 1.6288E+00 | −1.1740E+00 | 2.1768E−02 | −9.0180E−02 |
| A10 = | 9.7068E−01 | 1.6940E−01 | −4.4956E−01 | 3.1668E−02 |
| A12 = | −3.1758E+00 | 1.2015E+00 | 5.4814E−01 | −2.6632E−03 |
| A14 = | 2.3481E+00 | −5.8380E−01 | −2.1139E−01 | −9.4706E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f | 1.94 | (CT2 + CT4)/TD | 0.28 |
| Fno | 2.04 | f1/f2 | −0.71 |
| HFOV | 42.5 | f2/f4 | 2.01 |
| (R3 − R4)/(R3 + R4) | −0.59 | V4 − V2 | 33.3 |
| (R5 − R6)/(R5 + R6) | 0.66 | 1/|tan(HFOV)| | 1.09 |
| (CT1 + CT3)/TD | 0.55 | TTL/ImgH | 1.647 |

Figure 7A:
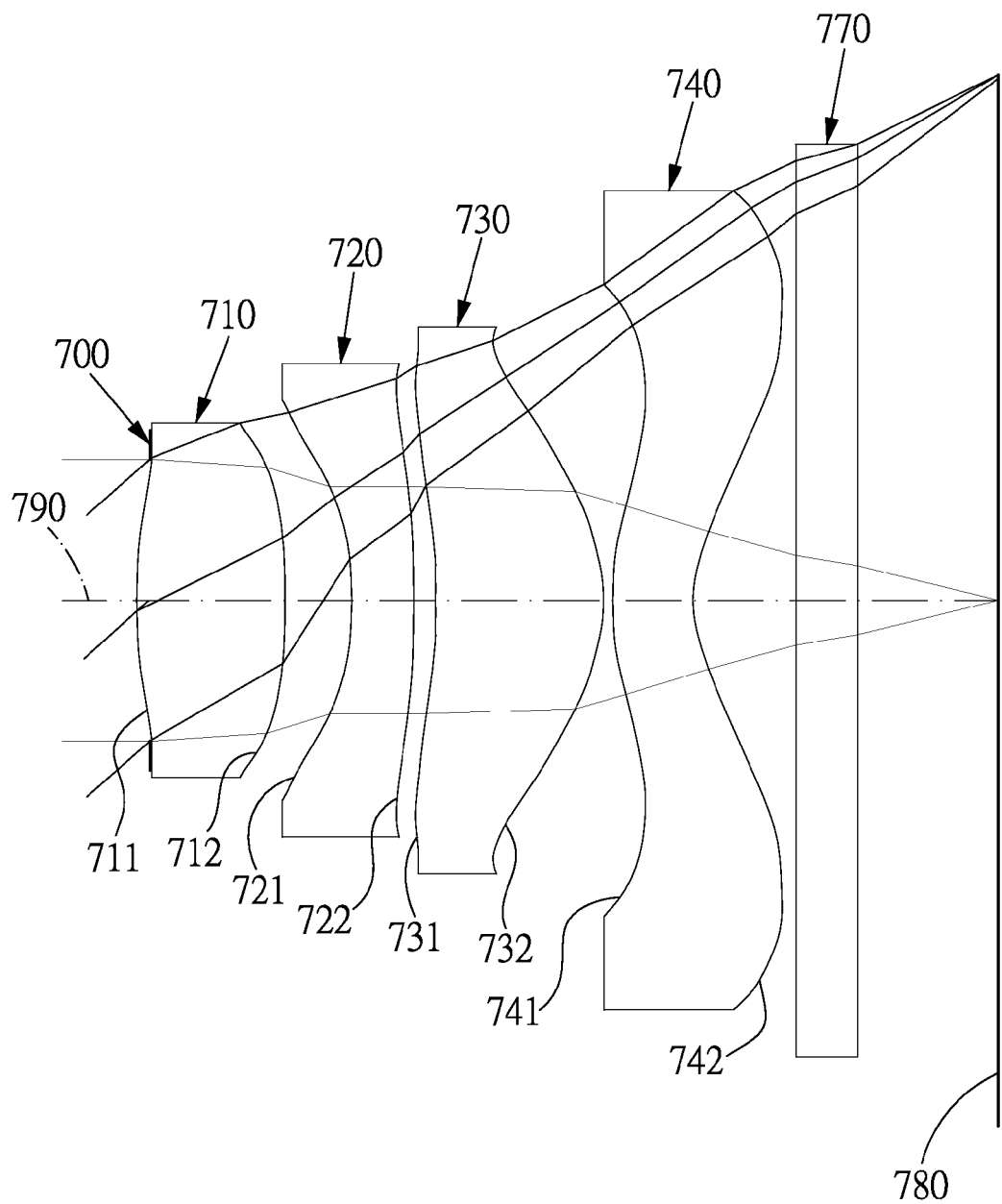
FIG. 7A shows an optical imaging lens assembly in accordance with a seventh embodiment of the present invention.
Figure 7B:
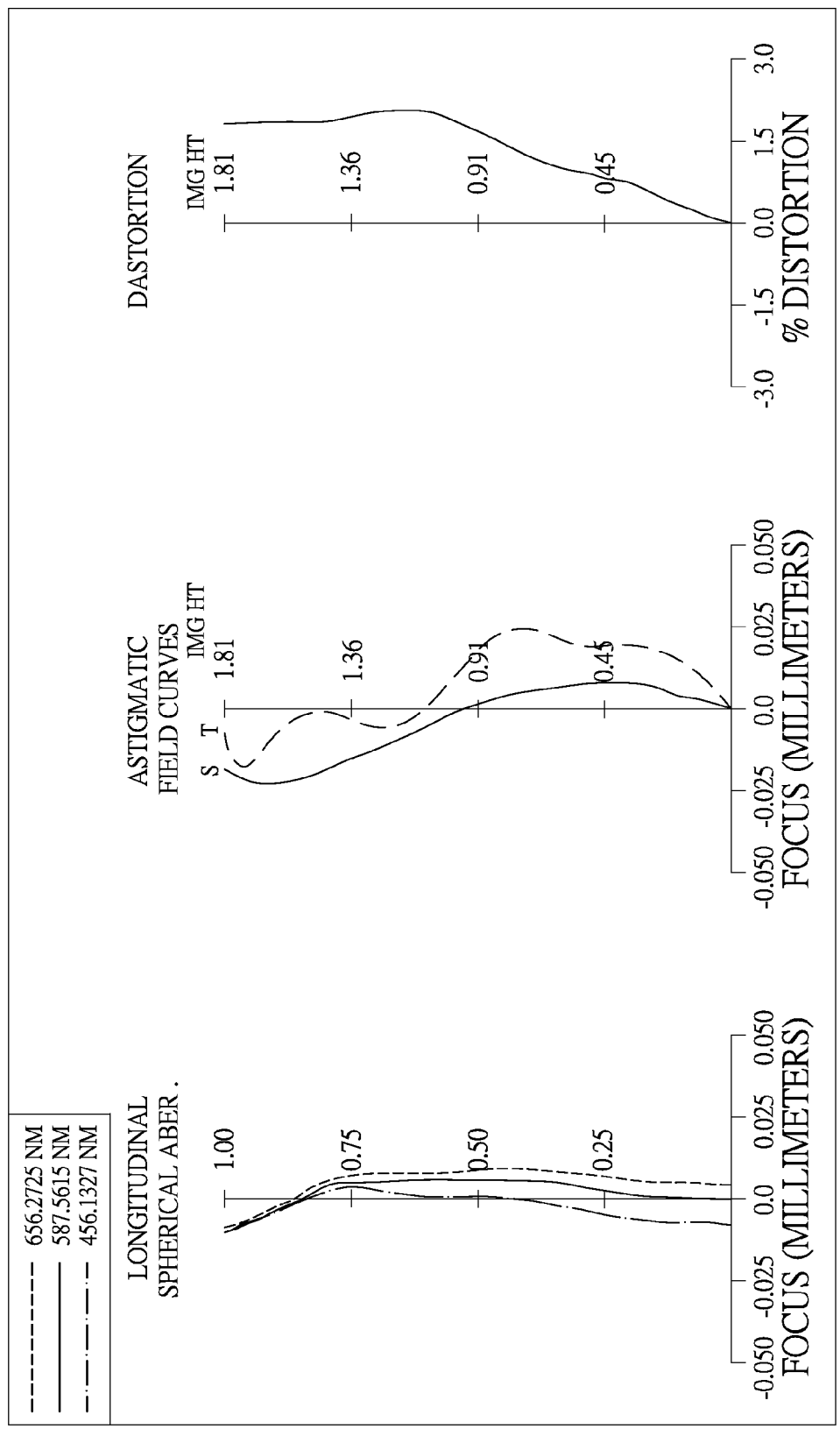
FIG. 7B shows the longitudinal spherical aberration curve, the astigmatic field curve and the distortion curve of the seventh embodiment of the present invention.

FIG. 7A shows an optical imaging lens assembly in accordance with a seventh embodiment of the present invention, and FIG. 7B shows, in order from left to right, the longitudinal spherical aberration curves, the astigmatic field curves, and the distortion curve of the seventh embodiment of the present invention. An optical imaging lens assembly in accordance with the seventh embodiment of the present invention comprises an aperture stop 700 and an optical assembly. The optical assembly comprises, in order from an object side to an image side: a first lens element 710, a second lens element 720, a third lens element 730, a fourth lens element 740, an IR cut filter 770 and an image plane 780, wherein the optical imaging lens assembly has a total of four lens elements with refractive power. The aperture stop 700 is located between an image-side surface 712 of the first lens element 710 and an object to be photographed.

The first lens element 710 with a positive refractive power has an object-side surface 711 being convex near an optical axis 790 and the image-side surface 712 being convex near the optical axis 790, both the object-side and image-side surfaces 711, 712 are aspheric, and the first lens element 710 is made of plastic material.

The second lens element 720 with a negative refractive power has an object-side surface 721 being concave near the optical axis 790 and an image-side surface 722 being concave near the optical axis 790, both the object-side and image-side surfaces 721, 722 are aspheric, and the second lens element 720 is made of plastic material.

The third lens element 730 with a positive refractive power has an object-side surface 731 being concave near the optical axis 790 and an image-side surface 732 being convex near the optical axis 790, both the object-side and image-side surfaces 731, 732 are aspheric, the third lens element 730 is made of plastic material.

The fourth lens element 740 with a negative refractive power has an object-side surface 741 being convex near the optical axis 790 and an image-side surface 742 being concave near the optical axis 790, both the object-side and image-side surfaces 741, 742 are aspheric, the fourth lens element 740 is made of plastic material, and more than one inflection point is formed on the object-side surface 741 and the image-side surface 742 of the fourth lens element 740.

The IR cut filter 770 made of glass is located between the fourth lens element 740 and the image plane 780 and has no influence on the focal length of the optical imaging lens assembly.

The detailed optical data of the seventh embodiment is shown in Table 13 and the aspheric surface data is shown in Table 14 below.

TABLE 13

(Embodiment 7)
f(focal length) = 1.97 mm, Fno = 2.05, HFOV = 42.1 deg.

| Surface | | Curvature Radius | Thickness | Material | index | Abbe # | Focal length |
|---|---|---|---|---|---|---|---|
| 0 | Object | Plane | Infinity | | | | |
| 1 | Aperture stop | Plane | −0.048 | | | | |
| 2 | Lens 1 | 1.681(ASP) | 0.509 | Plastic | 1.544 | 55.9 | 2.01 |
| 3 | | −2.795(ASP) | 0.235 | | | | |
| 4 | Lens 2 | −1.412(ASP) | 0.220 | Plastic | 1.641 | 22.6 | −2.84 |
| 5 | | −5.720(ASP) | 0.067 | | | | |
| 6 | Lens 3 | −2.329(ASP) | 0.591 | Plastic | 1.544 | 55.9 | 1.22 |
| 7 | | −0.565(ASP) | 0.030 | | | | |
| 8 | Lens 4 | 1.002(ASP) | 0.283 | Plastic | 1.535 | 56.3 | −1.73 |
| 9 | | 0.437(ASP) | 0.354 | | | | |
| 10 | IR-filter | Plane | 0.21 | Glass | 1.517 | 64.2 | — |
| 11 | | Plane | 0.49 | | | | |
| 12 | Image | Plane | | | | | |

TABLE 14

Aspheric Coefficients

| | Surface # | | | |
|---|---|---|---|---|
| | 2 | 3 | 4 | 5 |
| K = | 9.0492E+00 | 6.6888E+00 | 2.5641E+00 | −2.5278E+00 |
| A4 = | −3.8567E−01 | −5.0410E−01 | −1.0037E+00 | −3.8391E−01 |
| A6 = | −1.3921E+00 | 1.3501E−01 | 2.2892E+00 | 7.2148E−01 |
| A8 = | 1.3479E+01 | −1.2073E+00 | −4.8955E+00 | −1.0971E−01 |
| A10 = | −1.5444E+02 | 8.3034E−01 | 5.2049E+00 | 3.2102E−02 |
| A12 = | 6.8126E+02 | 4.5623E+00 | −1.6891E+01 | −9.9516E−01 |
| A14 = | −1.2385E+03 | −9.9423E+00 | 1.8969E+01 | 1.1367E+00 |

| | Surface # | | | |
|---|---|---|---|---|
| | 6 | 7 | 8 | 9 |
| K = | 6.1125E+00 | −4.1840E+00 | −8.3226E−01 | −3.6840E+00 |
| A4 = | 7.5327E−01 | −3.9055E−01 | −7.2306E−01 | −2.5135E−01 |
| A6 = | −1.7360E+00 | 8.3879E−01 | 3.5312E−01 | 1.4865E−01 |
| A8 = | 1.6396E+00 | −1.1565E+00 | 8.7076E−03 | −9.0562E−02 |
| A10 = | 1.0479E+00 | 1.9102E−01 | −4.5982E−01 | 3.1676E−02 |
| A12 = | −3.1058E+00 | 1.2159E+00 | 5.4192E−01 | −2.0957E−03 |
| A14 = | 2.4362E+00 | −5.8183E−01 | −2.0463E−01 | −1.5484E−03 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| Embodiment 7 | | | |
|---|---|---|---|
| f | 1.97 | (CT2 + CT4)/TD | 0.26 |
| Fno | 2.05 | f1/f2 | −0.71 |
| HFOV | 42.1 | f2/f4 | 1.64 |
| (R3 − R4)/(R3 + R4) | −0.60 | V4 − V2 | 33.7 |
| (R5 − R6)/(R5 + R6) | 0.61 | 1/|tan(HFOV)| | 1.11 |
| (CT1 + CT3)/TD | 0.57 | TTL/ImgH | 1.646 |

Figure 8A:
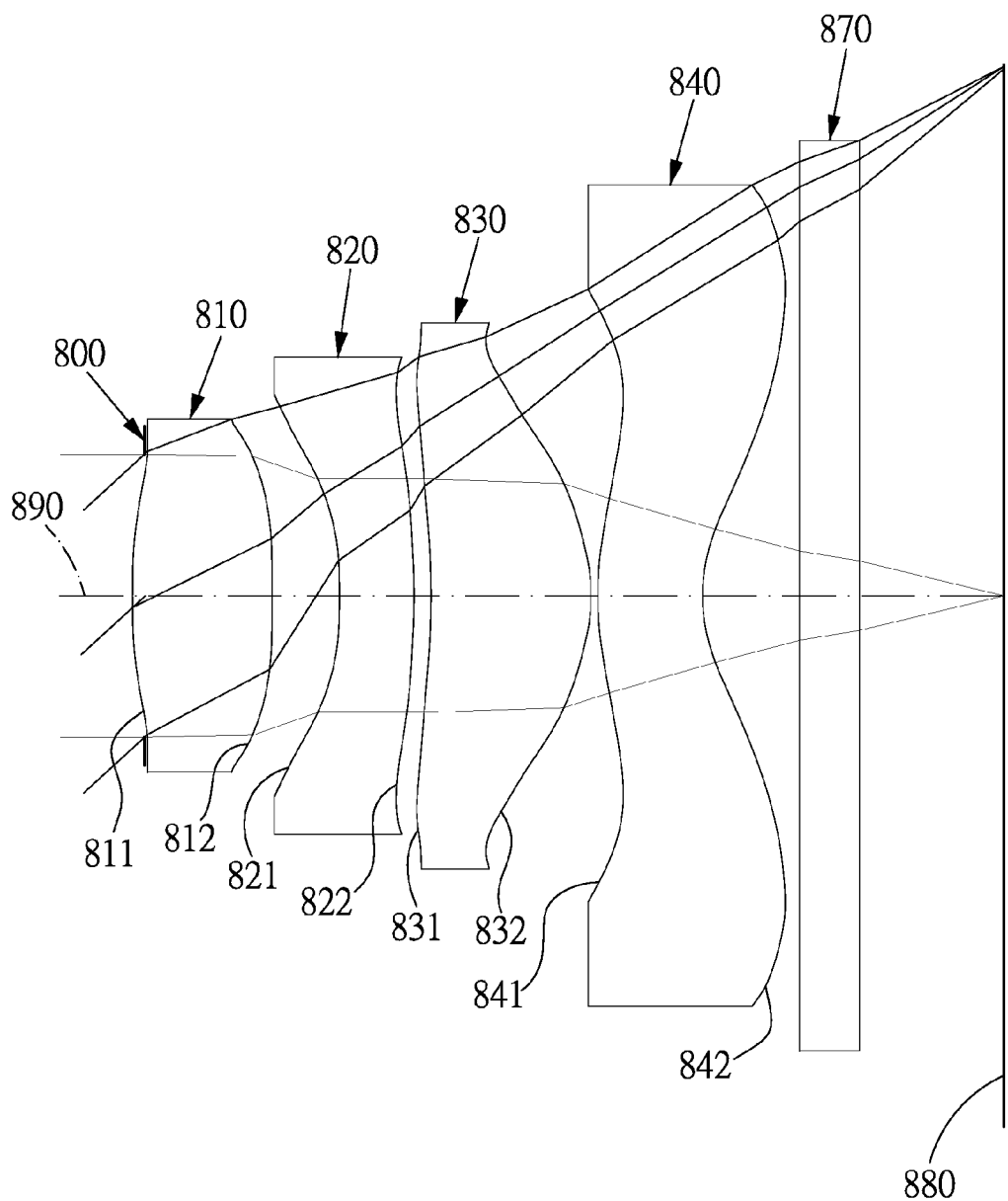
FIG. 8A shows an optical imaging lens assembly in accordance with an eighth embodiment of the present invention.
Figure 8B:
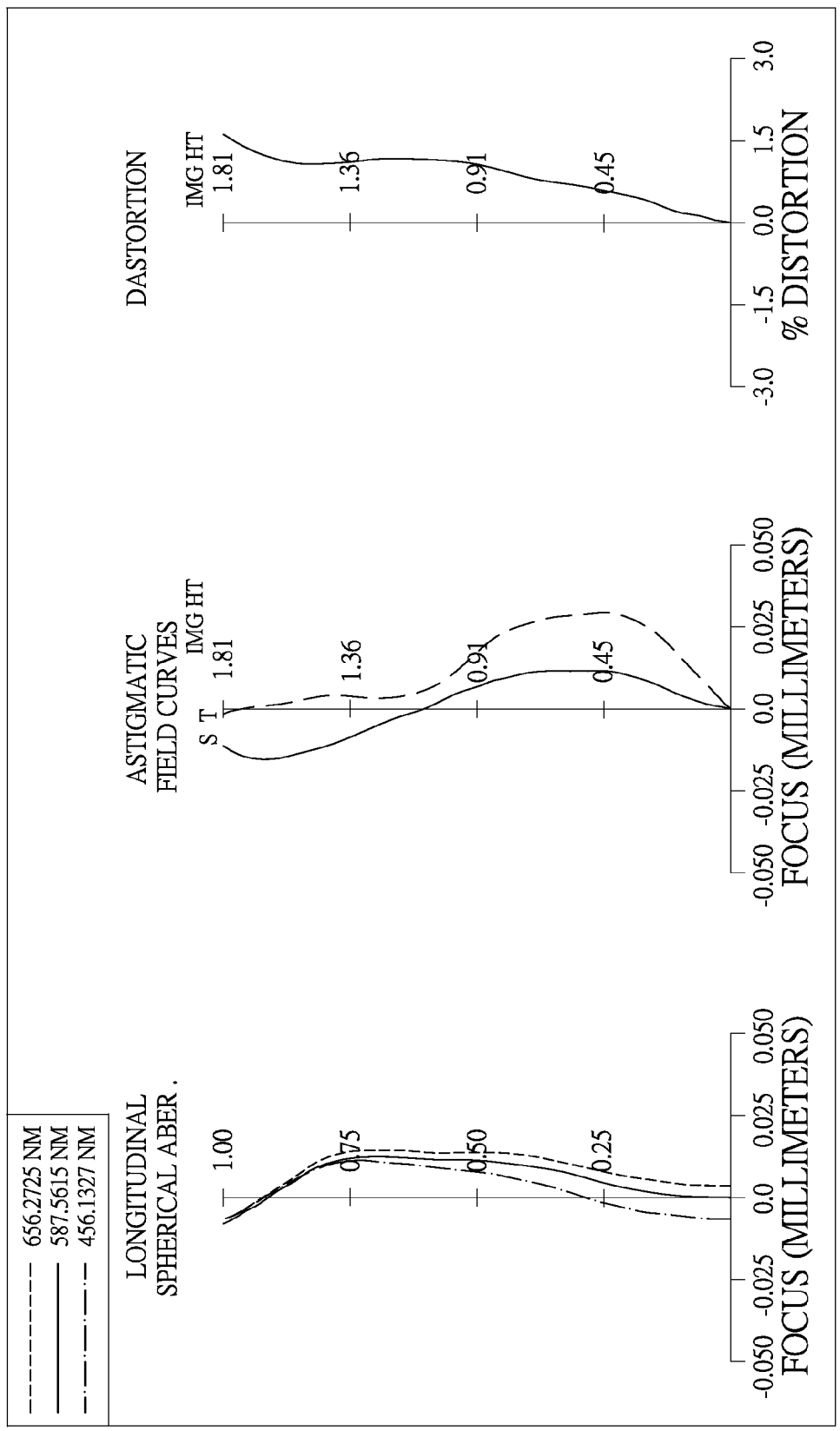
FIG. 8B shows the longitudinal spherical aberration curve, the astigmatic field curve and the distortion curve of the eighth embodiment of the present invention.

FIG. 8A shows an optical imaging lens assembly in accordance with an eighth embodiment of the present invention, and FIG. 8B shows, in order from left to right, the longitudinal spherical aberration curves, the astigmatic field curves, and the distortion curve of the eighth embodiment of the present invention. An optical imaging lens assembly in accordance with the eighth embodiment of the present invention comprises an aperture stop 800 and an optical assembly. The optical assembly comprises, in order from an object side to an image side: a first lens element 810, a second lens element 820, a third lens element 830, a fourth lens element 840, an IR cut filter 870 and an image plane 880, wherein the optical imaging lens assembly has a total of four lens elements with refractive power. The aperture stop 800 is located between an image-side surface 812 of the first lens element 810 and an object to be photographed.

The first lens element 810 with a positive refractive power has an object-side surface 811 being convex near an optical axis 890 and the image-side surface 812 being convex near the optical axis 890, both the object-side and image-side surfaces 811, 812 are aspheric, and the first lens element 810 is made of plastic material.

The second lens element 820 with a negative refractive power has an object-side surface 821 being concave near the optical axis 890 and an image-side surface 822 being concave near the optical axis 890, both the object-side and image-side surfaces 821, 822 are aspheric, and the second lens element 820 is made of plastic material.

The third lens element 830 with a positive refractive power has an object-side surface 831 being concave near the optical axis 890 and an image-side surface 832 being convex near the optical axis 890, both the object-side and image-side surfaces 831, 832 are aspheric, the third lens element 830 is made of plastic material.

The fourth lens element 840 with a negative refractive power has an object-side surface 841 being convex near the optical axis 890 and an image-side surface 842 being concave near the optical axis 890, both the object-side and image-side surfaces 841, 842 are aspheric, the fourth lens element 840 is made of plastic material, and more than one inflection point is formed on the object-side surface 841 and the image-side surface 842 of the fourth lens element 840.

The IR cut filter 870 made of glass is located between the fourth lens element 840 and the image plane 880 and has no influence on the focal length of the optical imaging lens assembly.

The detailed optical data of the eighth embodiment is shown in Table 15 and the aspheric surface data is shown in Table 16 below.

TABLE 15

(Embodiment 8)
f(focal length) = 1.98 mm, Fno = 2.05, HFOV = 41.9 deg.

| Surface | | Curvature Radius | Thickness | Material | index | Abbe # | Focal Length |
|---|---|---|---|---|---|---|---|
| 0 | Object | Plane | Infinity | | | | |
| 1 | Aperture stop | Plane | −0.045 | | | | |
| 2 | Lens 1 | 1.681(ASP) | 0.479 | Plastic | 1.544 | 55.9 | 1.99 |
| 3 | | −2.759(ASP) | 0.234 | | | | |
| 4 | Lens 2 | −1.356(ASP) | 0.244 | Plastic | 1.641 | 22.6 | −2.82 |
| 5 | | −5.570(ASP) | 0.063 | | | | |
| 6 | Lens 3 | −2.322(ASP) | 0.550 | Plastic | 1.544 | 55.9 | 1.44 |
| 7 | | −0.636(ASP) | 0.030 | | | | |
| 8 | Lens 4 | 1.158(ASP) | 0.365 | Plastic | 1.535 | 55.7 | −2.14 |
| 9 | | 0.517(ASP) | 0.325 | | | | |
| 10 | IR-filter | Plane | 0.21 | Glass | 1.517 | 64.2 | — |
| 11 | | Plane | 0.49 | | | | |
| 12 | Image | Plane | | | | | |

TABLE 16

Aspheric Coefficients

| | Surface # | | | |
|---|---|---|---|---|
| | 2 | 3 | 4 | 5 |
| K = | 9.0103E+00 | 8.2030E+00 | 2.5698E+00 | −8.0525E+00 |
| A4 = | −4.0226E−01 | −5.1732E−01 | −9.7791E−01 | −3.8598E−01 |
| A6 = | −1.4504E+00 | 1.3512E−01 | 2.3174E+00 | 7.3199E−01 |
| A8 = | 1.3341E+01 | −1.2221E+00 | −4.2063E−01 | −8.8419E−02 |
| A10 = | −1.5436E+02 | 6.0029E−01 | 5.3960E+00 | 5.9182E−02 |
| A12 = | 6.8126E+02 | 5.0834E+00 | −1.6713E+01 | −9.7091E−01 |
| A14 = | −1.2385E+03 | −9.9423E+00 | 1.8969E+01 | 1.1454E+00 |

| | Surface # | | | |
|---|---|---|---|---|
| | 6 | 7 | 8 | 9 |
| K = | 6.0798E+00 | −4.0143E+00 | −6.1657E−01 | −3.9848E+00 |
| A4 = | 7.7963E−01 | −3.7086E−01 | −7.0106E−01 | −2.5169E−01 |
| A6 = | −1.7144E+00 | 8.5042E−01 | 3.2335E−01 | 1.5983E−01 |
| A8 = | 1.6487E+00 | −1.1570E+00 | 2.4174E−02 | −8.9294E−02 |
| A10 = | 1.0407E+00 | 1.9395E−01 | −4.5484E−01 | 2.8460E−02 |
| A12 = | −3.1158E+00 | 1.2190E+00 | 5.4887E−01 | −2.8083E−03 |
| A14 = | 2.4267E+00 | −5.7015E−01 | −2.1833E−01 | −6.8920E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| Embodiment 8 | | | |
|---|---|---|---|
| f | 1.98 | (CT2 + CT4)/TD | 0.31 |
| Fno | 2.05 | f1/f2 | −0.71 |
| HFOV | 41.9 | f2/f4 | 1.32 |
| (R3 − R4)/(R3 + R4) | −0.61 | V4 − V2 | 33.1 |
| (R5 − R6)/(R5 + R6) | 0.57 | 1/|tan(HFOV)| | 1.11 |
| (CT1 + CT3)/TD | 0.52 | TTL/ImgH | 1.647 |

In the present optical imaging lens assembly, the lens elements can be made of plastic or glass. If the lens elements are made of plastic, the cost will be effectively reduced. If the lens elements are made of glass, there is more freedom in distributing the refractive power of the optical imaging lens assembly. Plastic lens elements can have aspheric surfaces, which allow more design parameter freedom (than spherical surfaces), so as to reduce the aberration and the number of the lens elements, as well as the total track length of the optical imaging lens assembly.

In the present optical imaging lens assembly, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The optical imaging lens assembly of the present invention can be used in focusing optical systems and can obtain better image quality. The optical imaging lens assembly of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

While we have shown and described various embodiments in accordance with the present invention, it should be clear to those skilled in the art that further embodiments may be made without departing from the scope of the present invention.

What is claimed is:

1. An optical imaging lens assembly comprising an aperture stop and an optical assembly, the optical assembly comprising: in order from an object side to an image side:
    a first lens element with a positive refractive power having an aspheric object-side surface being convex near an optical axis and an aspheric image-side surface, the first lens element being made of plastic material;
    a second lens element with a negative refractive power having an aspheric object-side surface being concave near an optical axis and an aspheric image-side surface being convex near an optical axis, the second lens element being made of plastic material;
    a third lens element with a positive refractive power having an aspheric object-side surface and an aspheric image-side surface being convex near an optical axis, the third lens element being made of plastic material;

a fourth lens element with a refractive power having an aspheric object-side surface being convex near an optical axis and an aspheric image-side surface being concave near an optical axis, the fourth lens element being made of plastic material, at least one inflection point being formed on the object-side and the image-side surfaces of the fourth lens element;

wherein a radius of curvature of the object-side surface of the second lens element is R3, a radius of curvature of the image-side surface of the second lens element is R4, a radius of curvature of the object-side surface of the third lens element is R5, a radius of curvature of the image-side surface of the third lens element is R6, and the following conditions are satisfied:

$-0.62<(R3-R4)/(R3+R4)<-0.51$;

$0.54<(R5-R6)/(R5+R6)<0.67$.

2. The optical imaging lens assembly as claimed in claim 1, wherein a central thickness of the first lens element is CT1, a central thickness of the third lens element is CT3, a distance along the optical axis between the object-side surface of the first lens element and the image-side surface of the fourth lens element is TD, and the following condition is satisfied:

$0.49<(CT1+CT3)/TD<0.61$.

3. The optical imaging lens assembly as claimed in claim 1, wherein a central thickness of the second lens element is CT2, a central thickness of the fourth lens element is CT4, a distance along the optical axis between the object-side surface of the first lens element and the image-side surface of the fourth lens element is TD, and the following condition is satisfied:

$0.25<(CT2+CT4)/TD<0.32$.

4. The optical imaging lens assembly as claimed in claim 1, wherein a f-number of the optical imaging lens assembly is Fno, and the following condition is satisfied:

$2.0 \leq Fno \leq 2.4$.

5. The optical imaging lens assembly as claimed in claim 1, wherein a focal length of the first lens element is f1, a focal length of the second lens element is f2, and the following condition is satisfied:

$-0.76<f1/f2<-0.61$.

6. The optical imaging lens assembly as claimed in claim 1, wherein a focal length of the second lens element is f2, a focal length of the fourth lens element is f4, and the following condition is satisfied:

$1.25<f2/f4<2.29$.

7. The optical imaging lens assembly as claimed in claim 1, wherein an Abbe number of the second lens element is V2, an Abbe number of the fourth lens element is V4, and the following condition is satisfied:

$18<V4-V2<38$.

8. The optical imaging lens assembly as claimed in claim 1, wherein half of a maximal field of view of the optical imaging lens assembly is HFOV, and the following condition is satisfied:

$1/|\tan(HFOV)|<1.19$.

9. The optical imaging lens assembly as claimed in claim 1, wherein a distance from the object-side surface of the first lens element to an image plane along the optical axis is TTL, half of a maximum diagonal imaging height of the optical imaging lens assembly is ImgH, and the following condition is satisfied:

$TTL/ImgH<1.68$.

10. An optical imaging lens assembly comprising an aperture stop and an optical assembly, the optical assembly comprising: in order from an object side to an image side:

a first lens element with a positive refractive power having an aspheric object-side surface being convex near an optical axis and an aspheric image-side surface being convex near an optical axis, the first lens element being made of plastic material;

a second lens element with a negative refractive power having an aspheric object-side surface being concave near an optical axis and an aspheric image-side surface being convex near an optical axis, the second lens element being made of plastic material;

a third lens element with a positive refractive power having an aspheric object-side surface being concave near an optical axis and an aspheric image-side surface being convex near an optical axis, the third lens element being made of plastic material;

a fourth lens element with a negative refractive power having an aspheric object-side surface being convex near an optical axis and an aspheric image-side surface being concave near an optical axis, the fourth lens element being made of plastic material, at least one inflection point being formed on the object-side and the image-side surfaces of the fourth lens element;

wherein a radius of curvature of the object-side surface of the second lens element is R3, a radius of curvature of the image-side surface of the second lens element is R4, a radius of curvature of the object-side surface of the third lens element is R5, a radius of curvature of the image-side surface of the third lens element is R6, and the following conditions are satisfied:

$-0.65<(R3-R4)/(R3+R4)<-0.57$;

$0.51<(R5-R6)/(R5+R6)<0.71$.

11. The optical imaging lens assembly as claimed in claim 10, wherein a central thickness of the first lens element is CT1, a central thickness of the third lens element is CT3, a distance along the optical axis between the object-side surface of the first lens element and the image-side surface of the fourth lens element is TD, and the following condition is satisfied:

$0.45<(CT1+CT3)/TD<0.67$.

12. The optical imaging lens assembly as claimed in claim 10, wherein a central thickness of the second lens element is CT2, a central thickness of the fourth lens element is CT4, a distance along the optical axis between the object-side surface of the first lens element and the image-side surface of the fourth lens element is TD, and the following condition is satisfied:

$0.23<(CT2+CT4)/TD<0.35$.

13. The optical imaging lens assembly as claimed in claim 10, wherein a f-number of the optical imaging lens assembly is Fno, and the following condition is satisfied:

$2.0 \leq Fno \leq 2.4$.

14. The optical imaging lens assembly as claimed in claim 10, wherein a focal length of the first lens element is f1, a focal length of the second lens element is f2, and the following condition is satisfied:

$-0.82<f1/f2<-0.58$.

15. The optical imaging lens assembly as claimed in claim 10, wherein a focal length of the second lens element is f2, a focal length of the fourth lens element is f4, and the following condition is satisfied:

$1.21 < f2/f4 < 2.42$.

16. The optical imaging lens assembly as claimed in claim 10, wherein an Abbe number of the second lens element is V2, an Abbe number of the fourth lens element is V4, and the following condition is satisfied:

$18 < V4 - V2 < 38$.

17. The optical imaging lens assembly as claimed in claim 10, wherein half of a maximal field of view of the optical imaging lens assembly is HFOV, and the following condition is satisfied:

$1/|\tan(HFOV)| < 1.19$.

18. The optical imaging lens assembly as claimed in claim 10, wherein a distance from the object-side surface of the first lens element to an image plane along the optical axis is TTL, half of a maximum diagonal imaging height of the optical imaging lens assembly is ImgH, and the following condition is satisfied:

$TTL/ImgH < 1.68$.

\* \* \* \* \*